(12) United States Patent
Garcia

(10) Patent No.: US 7,120,309 B2
(45) Date of Patent: Oct. 10, 2006

(54) GHOST IMAGE CORRECTION SYSTEM AND METHOD

(75) Inventor: Kevin J. Garcia, Tucson, AZ (US)

(73) Assignee: LightSharp LLC, Tucson, AZ (US)

( * ) Notice: Subject to any disclaimer, the term of this patent is extended or adjusted under 35 U.S.C. 154(b) by 879 days.

(21) Appl. No.: 10/008,594

(22) Filed: Nov. 8, 2001

(65) Prior Publication Data

US 2003/0086624 A1     May 8, 2003

(51) Int. Cl.
*G06K 9/40*     (2006.01)

(52) U.S. Cl. ............... 382/275; 382/260; 382/274; 358/3.26; 358/3.27; 352/160

(58) Field of Classification Search .......... 382/252, 382/274, 275, 255, 260; 358/3.26, 509, 521, 358/463, 3.27; 359/355, 364, 368; 348/614; 352/160
See application file for complete search history.

(56) References Cited

U.S. PATENT DOCUMENTS

| | | | |
|---|---|---|---|
| 3,834,786 A | 9/1974 | Carlsen | 350/3.5 |
| 4,526,443 A | 7/1985 | Hirose | 350/415 |
| 4,892,397 A | 1/1990 | Horiuchi | 350/425 |
| 4,981,352 A | 1/1991 | Tejima et al. | 353/31 |
| 5,046,110 A | 9/1991 | Carucci et al. | 382/8 |
| 5,083,223 A * | 1/1992 | Igarashi | 359/708 |
| 5,095,387 A | 3/1992 | Horiuchi | 359/676 |
| 5,153,926 A | 10/1992 | Jansson et al. | 382/128 |
| 5,208,874 A | 5/1993 | Omura | 382/54 |
| 5,568,531 A | 10/1996 | Nishihagi et al. | 378/71 |
| 5,633,755 A | 5/1997 | Manabe et al. | 359/443 |
| 5,774,268 A | 6/1998 | Takahashi | 359/630 |
| 5,777,674 A * | 7/1998 | Ohmuro | 348/338 |
| 5,802,408 A | 9/1998 | Suda | 396/296 |
| 5,808,791 A | 9/1998 | Kawano et al. | 359/434 |
| 5,812,629 A | 9/1998 | Clauser | 378/62 |

(Continued)

FOREIGN PATENT DOCUMENTS

JP     11133353     5/1999

(Continued)

OTHER PUBLICATIONS

Jansson patent application entitled: Method, Program and Apparatus for Efficiently Removing Stray-Flux Effects by Selected-Ordinate Image Processing, see p. 3 and exhibit y of application.

(Continued)

*Primary Examiner*—Bhavesh M. Mehta
*Assistant Examiner*—Yosef Kassa
(74) *Attorney, Agent, or Firm*—Lawrence R. Oremland PC

(57) ABSTRACT

A new and useful method and system for correcting for ghost images in a telecentric optical system is provided. Ghost images generated from planar optical surfaces in the image space after the major elements of a telecentric optical system are shift invariant. In other words the ghost images produced by these optical elements do not change their shape with different field angles or points. The ghost image's invariance with field position will allow the ghost image to be subtracted or removed from the image of an object recorded on a digital detector such as CCD or CMOS detector when its optical system is telecentric in image space. This subtraction may be accomplished, for example, with a removal technique using a measured ghost function germane and invariant to that particular optical system. The combination of the ghost image and scatter functions is linearly shift invariant and therefore, both noise contributions could be removed from the resulting digital image using similar removal techniques.

13 Claims, 13 Drawing Sheets

U.S. PATENT DOCUMENTS

| | | | |
|---|---|---|---|
| 5,878,152 A | 3/1999 | Sussman | 382/106 |
| 5,914,818 A * | 6/1999 | Tejada et al. | 359/663 |
| 6,016,229 A | 1/2000 | Suzuki | 359/784 |
| 6,028,671 A | 2/2000 | Svetkoff et al. | 356/368 |
| 6,043,938 A | 3/2000 | Ogasawara | 359/652 |
| 6,084,706 A * | 7/2000 | Tamkin et al. | 359/366 |
| 6,181,475 B1 * | 1/2001 | Togino et al. | 359/630 |
| 6,208,470 B1 * | 3/2001 | Anderson et al. | 359/649 |
| 6,213,606 B1 | 4/2001 | Holman et al. | 353/20 |
| 6,220,713 B1 | 4/2001 | Tadic-Galeb et al. | 353/77 |
| 6,222,676 B1 | 4/2001 | Togino et al. | 359/630 |
| 6,248,988 B1 | 6/2001 | Krantz | 250/201.3 |
| 6,280,035 B1 | 8/2001 | Tadic-Galeb et al. | 353/31 |
| 2001/0028510 A1 | 10/2001 | Ramm et al. | |
| 2003/0053712 A1 | 3/2003 | Jansson | |

FOREIGN PATENT DOCUMENTS

| | | |
|---|---|---|
| JP | 11326825 | 11/1999 |

OTHER PUBLICATIONS

"Scalpel: A Projection Electron-Beam Approach to Sub-Optical Lithograph", Liddle, Lloyd, et al., Bell Laboratories, Lucent Technologies, may 1999, PP. 1-71.

"MIRCAM", Posselt, Winfried et al., PP. 1-10.

"A Parallel Implementation of Collective Learning Systems Theory", Peter Bock, Department of Electrical Engineering and Computer Science. 1990. PP. 457-469.

* cited by examiner

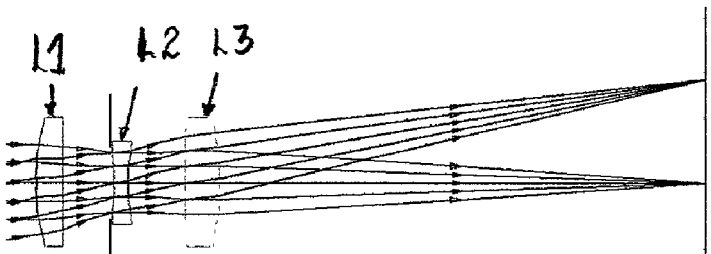
Figure 1 Triplet Lens System with On and Off Axis Point Sources
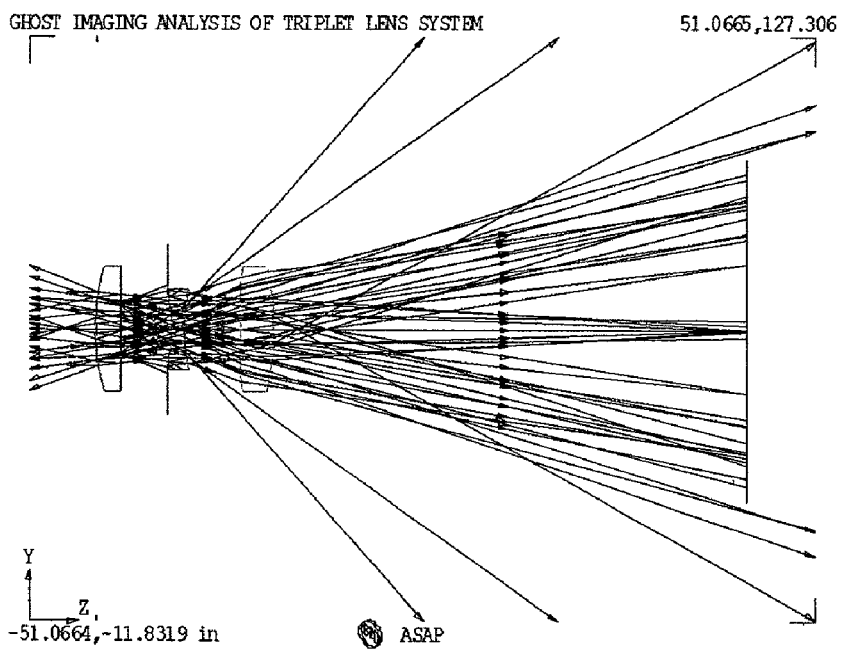
Figure 2 Ghost Reflections through Triplet from On-axis Point Source

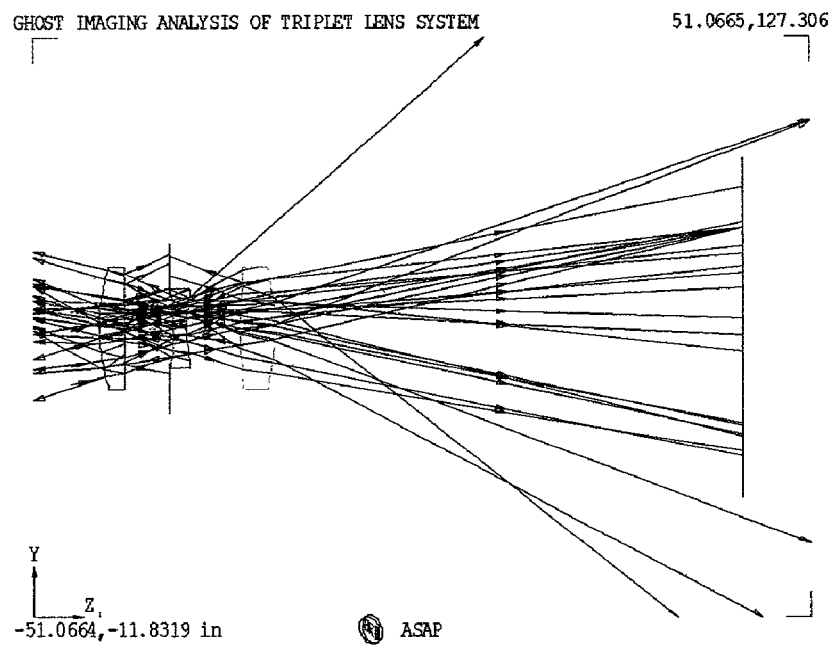
Figure 3 Ghost Reflections through Triplet from Off-axis Point Source
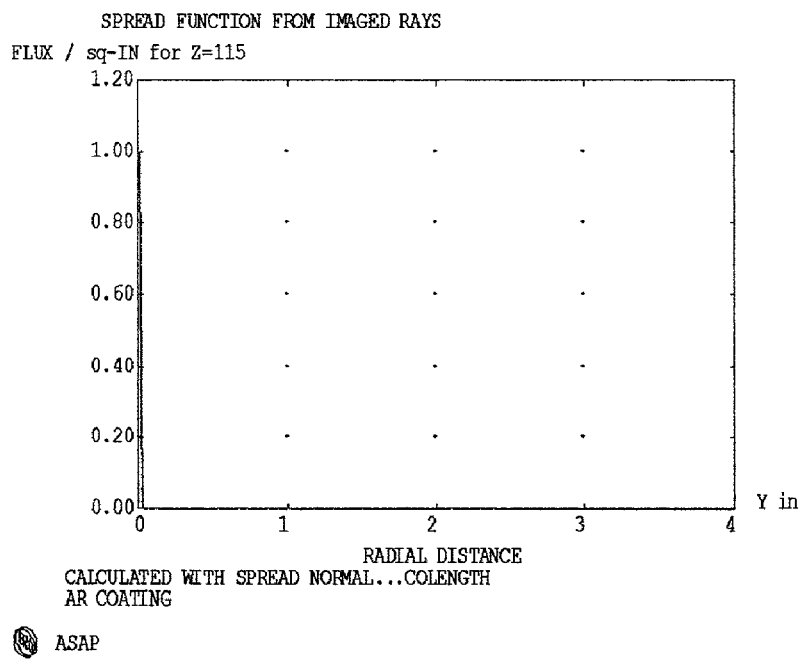
Figure 4 System PSF due to Diffraction and Aberration

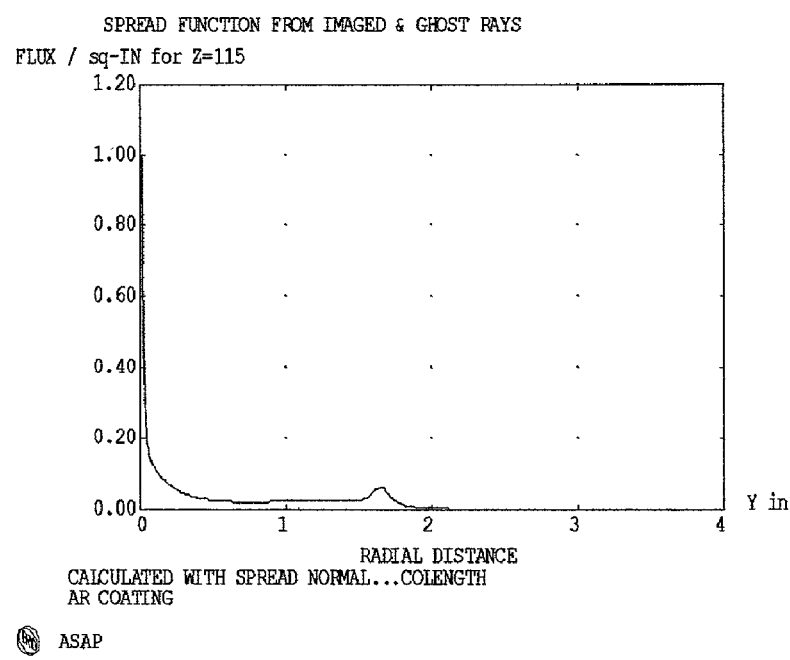
Figure 5 System PSF due to Diffraction, Aberration, and Ghost Images

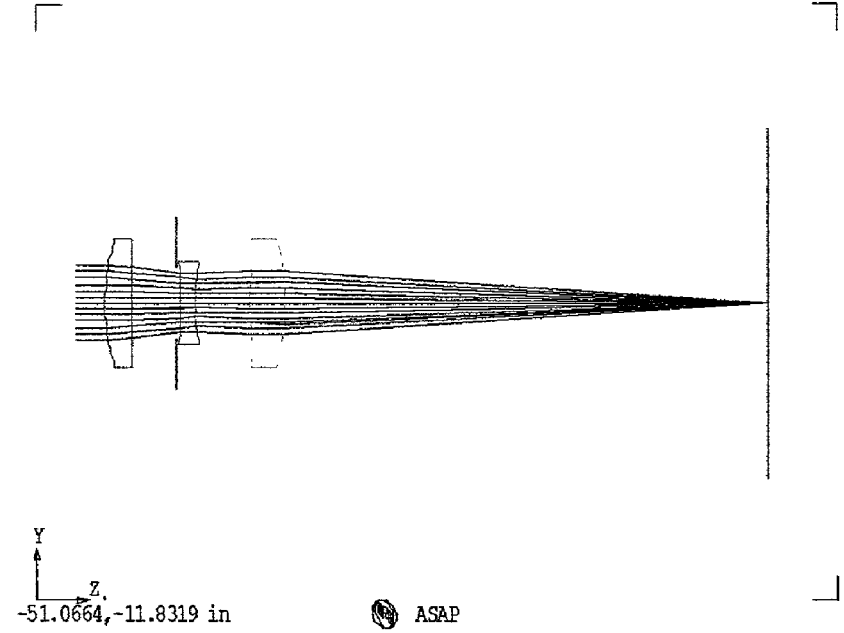
Figure 6 On-Axis Signal Path
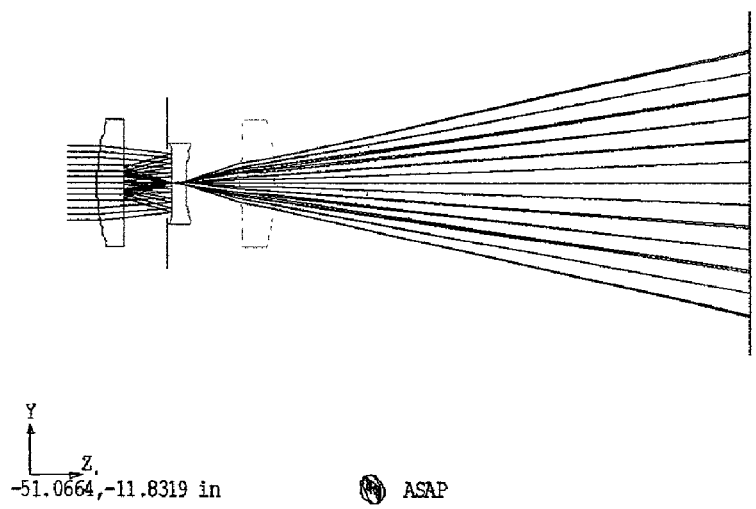
Figure 7 On-Axis Ghost Path of Most Energy

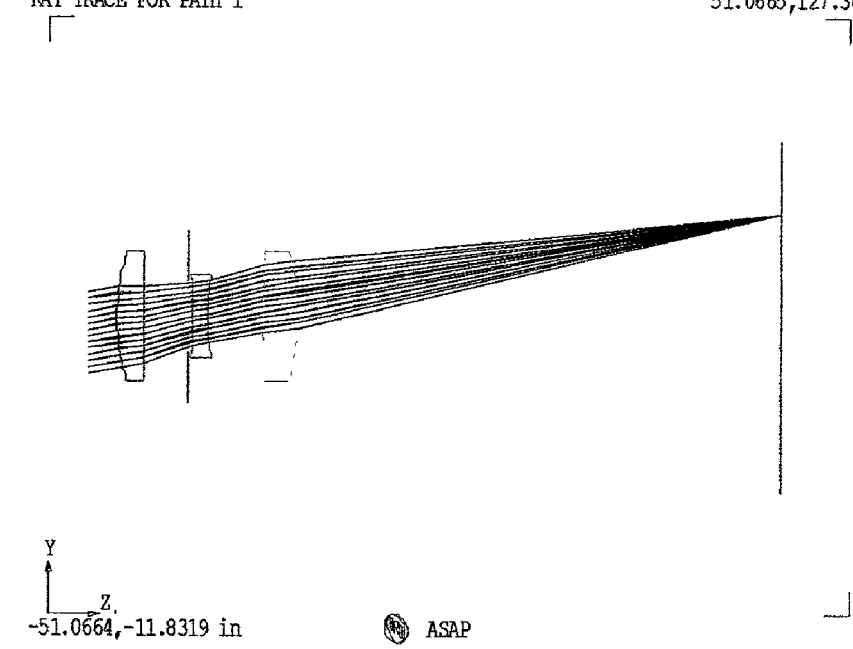
Figure 8 Off-Axis Signal Path
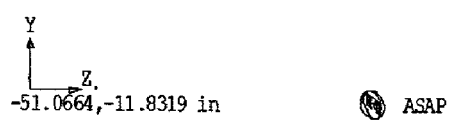
Figure 9 Off-Axis Ghost Path of Most Energy

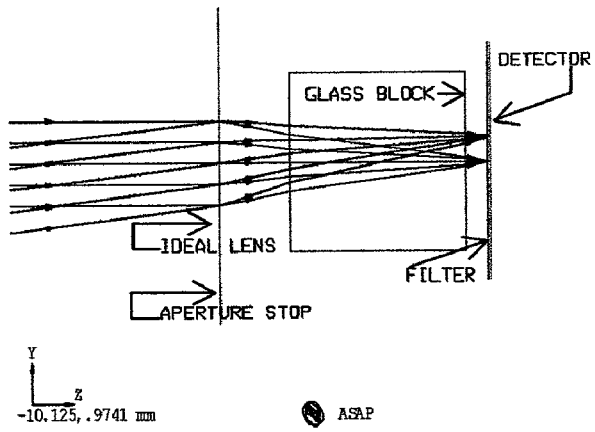
Figure 10 On and Off-axis Point Sources Imaged Through an Ideal Lens with the Stop at the Lens, A glass block, and a Filter
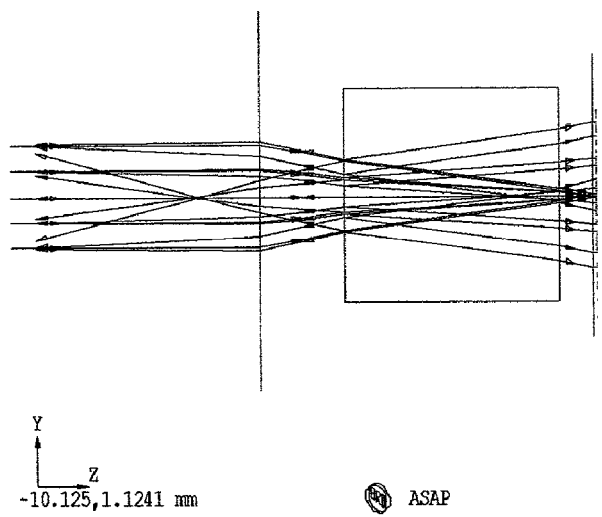
Figure 11 On-axis Ghost Rays

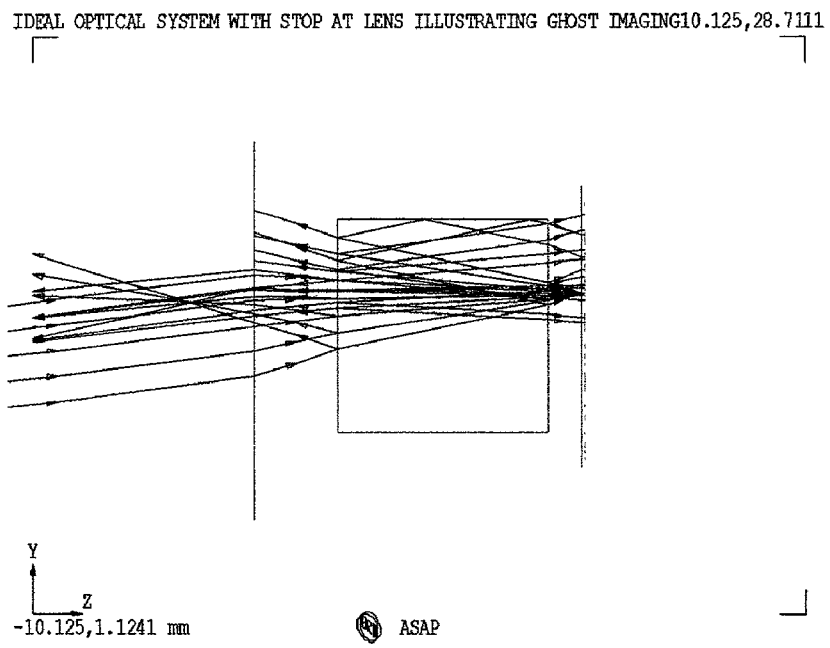
Figure 12 Off-axis Ghost Rays
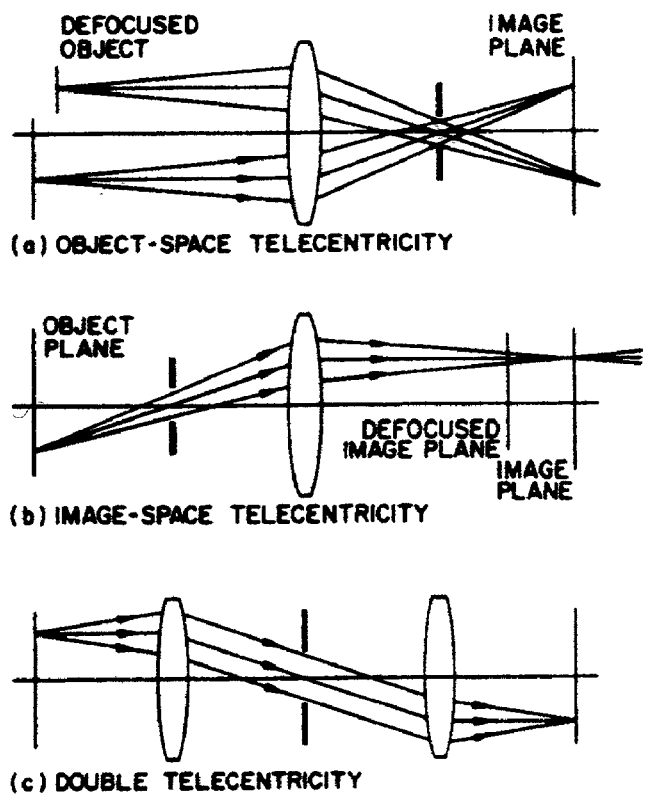
Figure 13 Telecentric Optical Systems

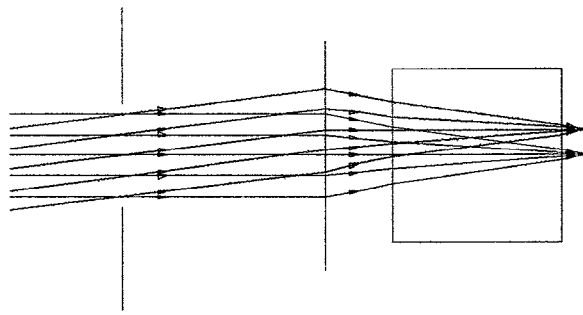
Figure 14 On and Off-axis Point Sources Imaged Through an Ideal Telecentric Lens System with the Stop at the front focal point, A glass block, and a Filter
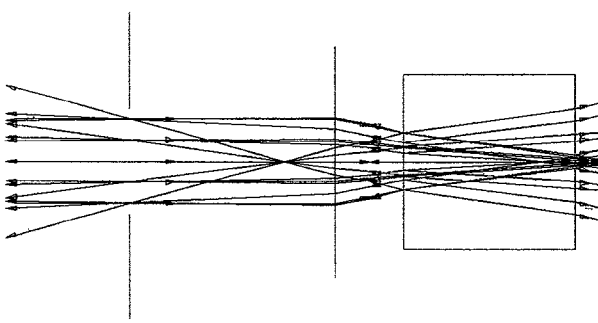
Figure 15 Ghost Image for an On-axis Point Source Through a Telecentric Optical System that is Telecentric in Image Space

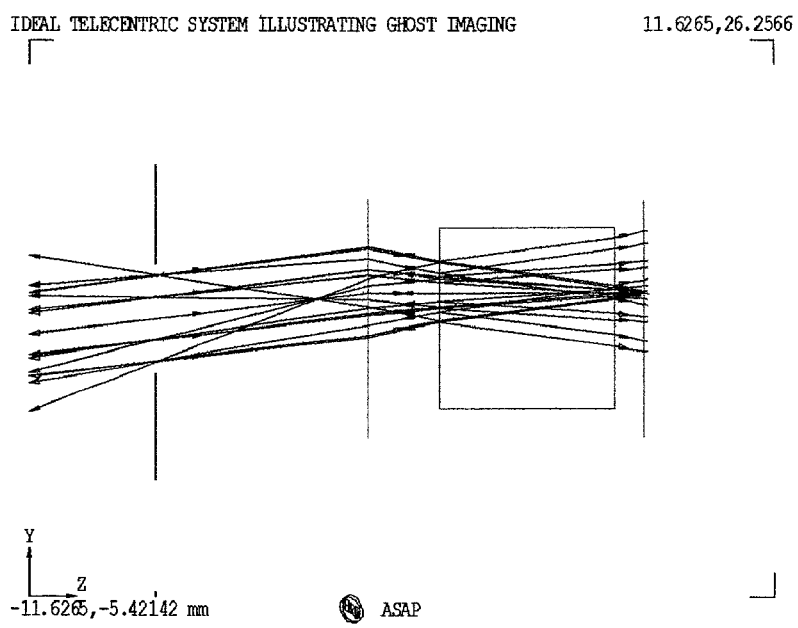
Figure 16 Ghost Image for an Off-axis Point Source Through a Telecentric Optical System that is Telecentric in Image Space

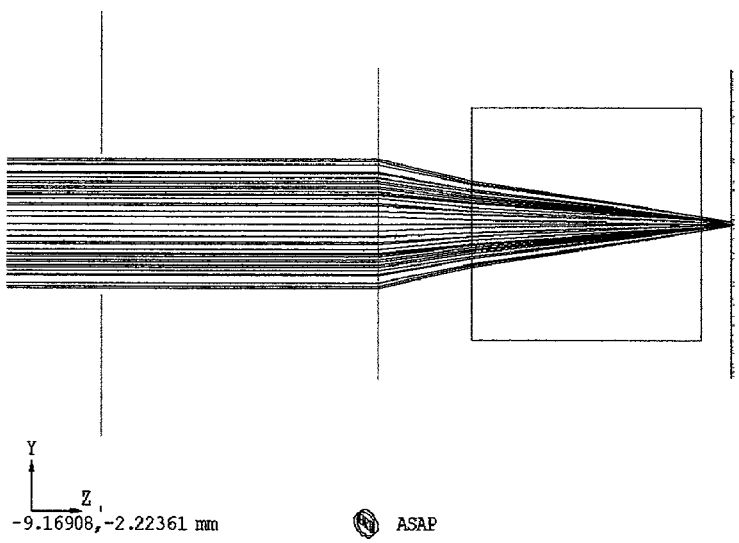
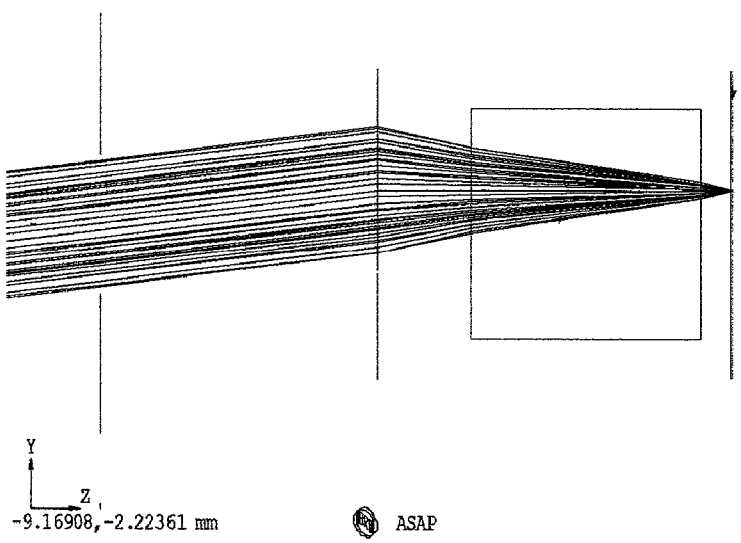
Figure 17 On and Off-axis Signal Paths

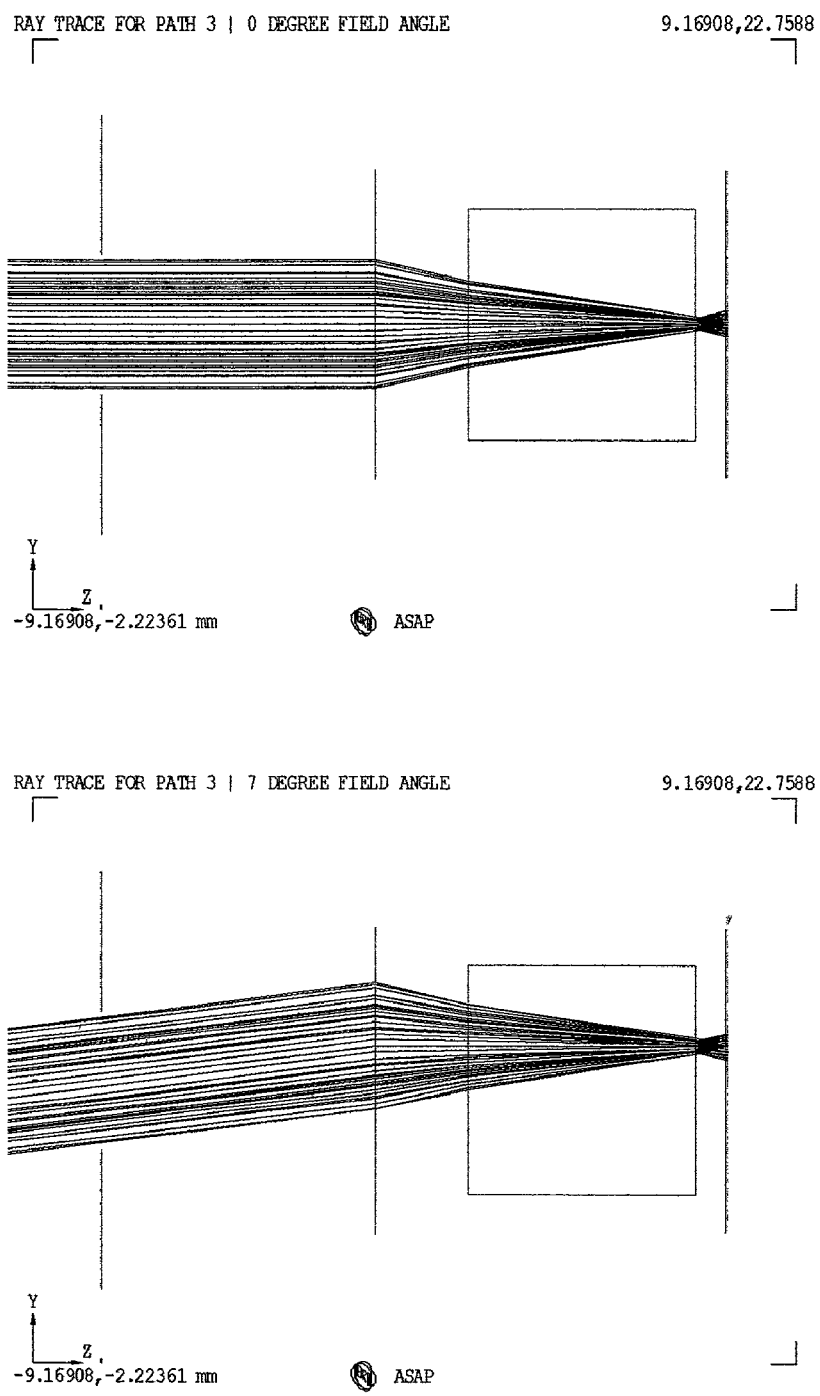
Figure 18 On and Off-axis Most Energetic Ghost Paths

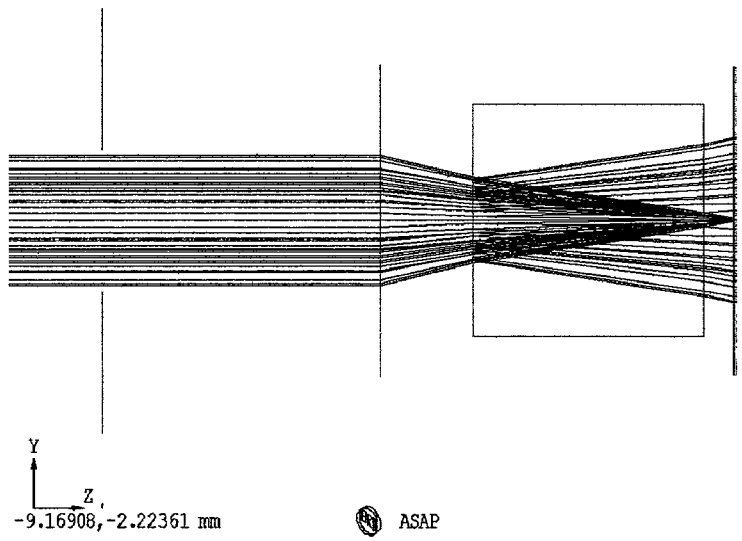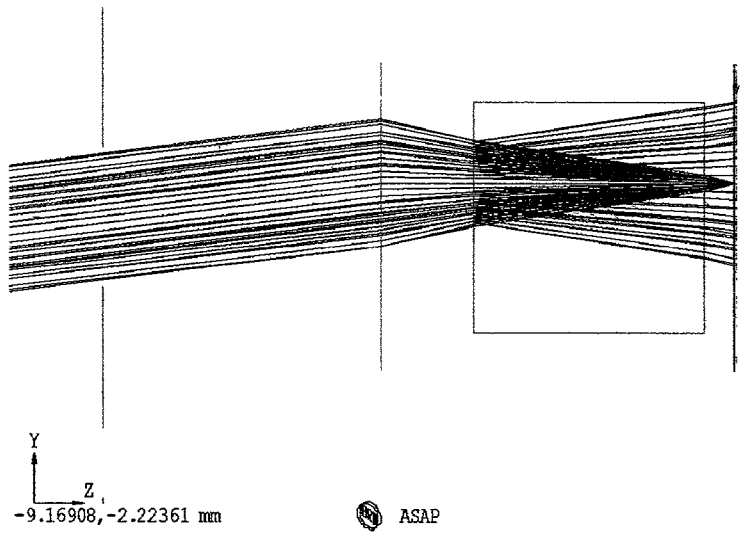
Figure 19 On and Off-axis Second Most Energetic Ghost Paths

GHOST IMAGE CORRECTION SYSTEM AND METHOD

TECHNICAL FIELD

The present invention provides a method and system for correcting for ghost images in a telecentric optical system.

INTRODUCTION

In order to understand the principles of the present invention, it is believed useful to provide the applicant's view regarding the nature of stray light in an optical system, the nature of telecentric optical systems, one software based system and method for correcting for stray light in an optical system, and the nature of ghost images in an optical system, particularly a telecentric optical system.

Stray Light

The quality of an image produced by an optical system is a function of diffracting, aberrating, and stray light processes. In fact these processes even occur in the most common optical system, the human eye. All of these processes cause light to spread out from a point source (an infinitesimal, self-luminous point) or a point object (an infinitesimal, illuminated point) when it is imaged through an optical system. Extended sources such as fluorescent lamps or extended objects such as scenes are made up of collections of point sources or point objects.

Optical engineers often compute the spread and shape of a point of light imaged through an optical system to assess the image forming qualities of the optical system in terms of the effects of diffraction and aberrations. Diffraction is the natural spreading of a point of light. In other words, even in a perfect optical system a beam of light cannot be focused to a point, it spreads out as it is focused. Aberrations are departures from ideal behavior. These are non-ideal behaviors introduced by the optical elements of an optical system that prevent imaging a point on the object through an optical system to a point on the image. The image point is aberrated or spread out but the spreading is due to the non-ideal behavior of the optical system as opposed to the spreading due to diffraction. The spreading of a point of light by an optical system is called the point-spread function. Diffraction and aberrations cause local spreading of image points, for example the point spreads over a few pixels of a digital camera's sensor. Optical systems whose aberrations are corrected are called diffraction limited because the size of a point of light is limited to the size imposed by diffraction and not aberrations. Optical system aberrations can be eliminated or reduced by the choice of appropriate lens designs. Diffraction and stray light, however, are inherent parts of the imaging process.

Stray light in optical systems is really unwanted light that is destructive, figuratively and literally, leading to at a minimum poor system performance and at a maximum product, or mission failure. Stray light obscures faint signals, decreases signal-to-noise ratio, reduces contrast, creates inaccurate radiometric and photometric results, and in high energy laser systems can even destroy optical elements and detectors! Stray light in these cases is caused by a number of phenomena including light scattered from optical and mechanical surfaces, edge diffraction from stops and baffles, unwanted diffraction orders from gratings, and thermal emission, and (as recognized by the present invention) ghost reflections from transmissive optical elements like lenses.

One of the more common types of stray light is created when light scatters off of mechanical and optical elements. Scattering is really an angular resolved reflection or transmission. Stray light created by scattering off of mechanical elements is sometimes more intuitive to visualize than scattering off of optical elements. Light incident on painted mechanical mounts in the field of view of the optical system has a high probability of diffusely reflecting (scattering) to the image plane. But high quality optical elements have even a higher probability of scattering light (diffusely transmitting) to the image plane, although perhaps at smaller orders of magnitude than mechanical surfaces because light interacts directly with the optical surface. Highly polished optical element surfaces are unable to produce perfectly specularly reflected or regular transmitted images. The process of manufacturing the lenses, such as grinding and polishing, creates micro-cracks at the optical surfaces that create scattered light. If the optical elements had perfect transmission or reflection they would be invisible to the human eye! The fact is that these optical elements scatter light incident on them just as every optical system scatters light. Even more scattered light is produced from contaminated surfaces.

Scattered light from optical surfaces in imaging systems is actually part of the incident light from a point source that is removed from its normal imaging path and redistributed or spread out over an area. Scattering causes light to spread out but over much larger areas than diffraction or aberrations. Scattered light, and for that matter stray light in general might even be consider a type of aberration because it is a departure from ideal behavior. Although the magnitude of light scattered is smaller than diffraction or aberrations, its effect is much broader and additive across the detector or image plane!

Scattered light is not only caused by subsurface damage created by manufacturing processes and surface contamination as mentioned above but also by scratches and pits on lens and mirror surfaces. Scatter can also be caused by inhomogenieties in the volume of the glass such as bubbles, pits, and striae. All of these effects primarily contribute to scatter in the field of view of the optical system. In-field scatter is typically caused by scatter from the optical components illuminated by sources in the field of view of the imaging system. Contamination causing in-field scatter can be reduced by carefully cleaning the optics, which unfortunately can also damage the optical surface creating even more scattered light.

A known software based method and system for removing in-field scattered light from the optical elements in the optical system uses a removal technique developed by Jansson and disclosed in U.S. Pat. No. 5,153,926, titled "A parallel Processing Network that Corrects for Light Scattering in Image Scanners", and by a subsequent Jansson Patent Application, entitled "Method, Program and Apparatus for Efficiently Removing Stray-Flux Effects by Selected-Ordinate Image Processing", Ser. No. 09/956,684, filed Sep. 20, 2001, both of which are incorporated by reference herein. The method does not assume a specific scatter function.

A common scattering function used in the field of optics is the Harvey scattering law, which is explained below. The Harvey law (1976, "Light scattering characteristics of optical surfaces", Ph.D. Dissertation, University of Arizona) is a scatter model that describes the scatter from smoothly polished surfaces with a minimum of two parameters. Harvey found an invariant relationship in scatter behavior as a function of incident angle when the bi-directional scattering distribution function (BSDF) is plotted in a special coordinate system. The BSDF is the reflectivity or transmissivity per unit solid angle of collected scatter. The Harvey BSDF model is peaked in the specular direction and is independent of the angle of incidence when the logarithm of the BSDF is plotted against the logarithm of the difference in the sine of the angles of scatter and reflection or transmission. A scattering surface that obeys the Harvey BSDF model is a straight line when plotted in this log-log space. Graphically, the Harvey curves for different angles of incidence are essentially lines that plot out all on top of each other. One of its parameters describes the slope of this line and the other parameter an intercept. Specifying a scattering function with only two parameters greatly reduces the dimensionality of the model and subsequently its complexity. Many polished surfaces exhibit a Harvey behavior. Many diffuse surfaces also follow the Harvey model if the BSDF is allowed to approach a finite constant at small angle of incidence.

An important mathematical feature of the Harvey model is that it is a shift invariant or an isoplanatic model. In general, shift invariance means that the only effect caused by a shift in the input is an equal shift in the output. Specifically, in the case of the Harvey model, the functional scatter behavior of the output does not change with angle of incidence for surfaces that follow the Harvey law. Furthermore, the scatter from many optical surfaces is linear shift invariant (LSI) if the scatter from these individual surfaces is equal to a linear combination of the sum of the outputs from the individual surfaces. Hence, the principle of superposition applies for linear systems since the overall response to a linear combination of inputs is just the linear combination of the individual outputs.

The basic Harvey model for isotropic surfaces without the shoulder parameter is $$BSDF(\theta_s, \theta) = b(100|\sin(\theta_s) - \sin(\theta)|)^S.$$

Here "b" is the BSDF at 0.01 radians, $\theta_s$ is the scatter angle, and $\theta$ is the specular angle both measured from the surface normal. The exponent "S" is slope of the BSDF curve when the logarithm of the BSDF is plotted versus the logarithm of the difference in the sine values of the scatter and reflected or transmitted angle. However, the BSDF of this equation can become ill defined in the specular direction. In reality the BSDF is defined close to the specular beam. To prevent the BSDF from becoming ill defined in the specular direction a shoulder roll off parameter is used in the Harvey BSDF model. The Harvey BSDF model with the shoulder parameter for normal incidence is operationally defined as $$BSDF(\theta_s) = b_0 \left(1 + \left(\frac{\sin(\theta_s)}{1}\right)^2\right)^{\frac{S}{2}}$$

$$b_0 = (b(1001))^S$$

Here b is the BSDF at 0.01 radians and $b_0$ is the BSDF at $\theta_s=0$. "1" is the shoulder point, in radians, at which the BSDF begins to roll over to a constant value.

Stray Light: Ghost Images (Reflections)

Ghost images are another manifestation of stray light. The predominant ghost images in most optical systems are produced by an inter-reflection of light off of surfaces that have nonzero reflection and transmission coefficients. The most common occurrence of a ghost image is probably the image of the pentagonal aperture stop of the optical system recorded on the image plane, which could be film or a general electronic detector such as a charged couple detector (CCD) or complementary metal-oxide silicon (CMOS) detector. These ghost images are due to a bright light source in the field of view of the optical system such as the sun or bright light. Exhibit A illustrates the ghost image produced by the sun manifested in the shape of the aperture stop. The image was produced by a 35 mm film based camera.

Ghost images generally are formed when some of the light from a point on the object incident on an optical surface is reflected at the optical surface while most of the light is transmitted through the surface. The surface reflecting light usually does so in a direction, which for the most part is opposite that of the incident beam and according to the law of reflection. A second optical surface, which does not necessarily have to be a surface of the element producing the first reflection, then reflects the light back toward the image plane. Part of this light is propagated to the image plane or detector and some can even undergo further ghost reflections. The culmination of all of such reflections from many different points imaged from the object results in a ghost image.

Transmissive optical materials, i.e. optical glasses, used to image objects emitting or scattering visible light have indices of refraction. The index of refraction is a measure of the speed of light in a vacuum divided by the speed of light in the optical material. Light travels more slowly in optical materials than a vacuum, which is the absence of matter. In other words the index of refraction is the distance light would travel in a vacuum in the same time it takes to travel a smaller distance in the optical material.

The index of refraction can be used to calculate the reflection and transmission coefficients for a ray of light at a particular interface. These equations are due to Fresnel and are angle and polarization (electric field) dependent.

$$R_s = \left(\frac{n_i \cos(\theta_i) - n_t \cos(\theta_t)}{n_i \cos(\theta_i) + n_t \cos(\theta_t)}\right)^2$$

$$T_s = \left(\frac{2n_i \cos(\theta_i)}{n_i \cos(\theta_i) + n_t \cos(\theta_t)}\right)^2$$

$$R_p = \left(\frac{n_t \cos(\theta_i) - n_i \cos(\theta_t)}{n_i \cos(\theta_t) + n_t \cos(\theta_i)}\right)^2$$

$$T_p = \left(\frac{2n_i \cos(\theta_i)}{n_i \cos(\theta_t) + n_t \cos(\theta_i)}\right)^2$$

The "s" state of polarization is the linear state of vibration of the electric field vector perpendicular to the plane of incidence. "s" is from the German word "senkret" which means perpendicular. It is also referred to as the transverse electric (TE) state or mode. The plane of incidence is the plane formed by the incident beam and the surface normal. The "p" state of polarization is the linear state of vibration of the electric field vector parallel to the plane of incidence. "p" is from the German word "parallel" which means parallel. It is also referred to as the transverse magnetic (TM) state or mode. The indices of refraction denoted by the letter "n" with a subscript are the indices of refraction for the incident (i) and the transmitted (t) media. The angles of incidence and transmission (refraction) are similarly indicated and are referenced to the surface normal.

The above equations for the reflection coefficient reduce to the same equation for a small pencil shaped beam of light at normal incidence to the surface. In other words the beam is parallel tjo the surface normal. The reflection equations for both "s" and "p" reduce to the following relationship.

$$R = R_s = R_p = \left(\frac{n_i - n_t}{n_i + n_t}\right)^2$$

Transmissive optical materials used to image objects emitting or scattering visible light have indices of refraction around 1.5. If the incident media has a refractive index of 1 then the reflection coefficient at normal incidence is approximately 4%. These reflections are quite large and can produce significant ghost reflections degrading the resulting image.

Anti-reflection (AR) coatings are applied to surfaces in order to reduce the reflection coefficient at the surface and hence ghost images. AR coatings are single or multilayer thin film coatings, whose thickness is usually on the order of a fraction of a wavelength, and whose index of refraction, along with its respective thickness, is chosen to reduce the reflection coefficient at an interface. For example, at normal incidence a quarter optical wave thickness of magnesium fluoride ($MgF_2$), a common and durable AR coating, with a refractive index of 1.38 yields a reflection coefficient calculated by the quarter wave rule of $$\text{Air } n_a = 1.0$$
$$\overline{MgF_2 \; n_{mag} = 1.38}$$
$$\overline{\text{Glass } n_g = 1.5}$$

$$\text{Air } n_a = 1.0$$
$$n_{eff} = \frac{n_{mag}^2}{n_g} = \frac{1.38^2}{1.5} = 1.2696$$

$$R = \frac{(1.0 - 1.2696)^2}{(1.0 + 1.2696)^2} \cong 1.4\%$$

Typical multi-layer, broadband anti-reflection coatings have a reflectivity on the order of 0.25% to 0.5%. Two reflections even at these reflectivities can still produce a significant ghost at the detector and these coatings are typically cost prohibitive in many optical systems.

An example of ghost imaging is illustrated in FIGS. 1 through 3 where each surface of the optical elements has a single layer anti-reflection (AR) coating. FIG. 1 illustrates the triplet lens system (i.e. lenses L1, L2, L3) with a collimated point source on axis and at 10 degrees off axis. The point source in this case is at infinity or a very large distance from the lens. A point source is a point singularity of emission on a source. Physically, the smallest point source is an atomic level emitter. Point sources emit spherical waves of radiation. The surface of constant phase of the light from the point source is called a wavefront. In other words a wavefront is a surface of constant spatial phase where the length of a line or optical path length from the point to the wavefront surface is the same at every point on the surface. The point source also is a very useful mathematical construct and whose deviation from a spherical shape by an optical system serves as an indication of the performance of the optical system. Extended sources or scenes are collections of point sources. Extended sources are made up of such point sources.

The emission of light from a point source can also be represented by a set of rays. A ray is a purely geometrical concept. It does not exist physically. It is basically a vector (line) that simulates radiative transfer. The spatial point of the ray vector is its location in space or the optical system. The direction of the ray vector is the propagation direction of the radiation. The power of the ray, its optical path length, or another parameter, can be considered the magnitude of the vector. Rays are normal to the wavefront. In fact they are the wavefront normals. Wavefronts are surfaces over which the optical path lengths (refractive index of the material the ray is in multiplied by the distance the ray travels in the material) of rays from a point source have the same length. The spherical waves from the point source become plane waves as they travel the great distance and the rays, which are perpendicular to the wavefront, become parallel to each other forming a "pencil" like beam of light.

FIGS. 2 and 3 illustrate a small number of ghosted rays traced through the optical system for the on-axis and off-axis cases. Clearly, the ghosted rays in both cases behave very differently. This is also observed in the point spread function (PSF) for each of the point sources. The PSF is the impulse or output response of the optical system to an input point source. If the optical system were perfect and exhibited no diffraction, aberration, or stray light then the PSF would be a perfect point. However, diffraction, the natural spreading of light as briefly mentioned above, causes a broadening of the PSF. The PSF can also be spread further by aberrations induced by the optical system. The concatenation of all of the PSF's from all object points results in the image.

Stray light including scattered light and the ghost images discussed here within also contribute to a spreading of the PSF. Their contributions are in effect added on top of the PSF due to diffraction and aberrations. The stray light manifests itself as a reduction in contrast and hence resolution and a change in color balance. Contrast is the difference in brightness between adjacent light and dark areas in a picture. Stray light that "spills" from a bright area into a dark area causes the bright area to look darker (energy loss) and the dark area to look brighter (energy gain) resulting in a reduced contrast. It can also cause significant differences in perceived color, which is the instantaneous color accorded to an object by a person. Different people see different perceived colors. Scattered light from one area of color or wavelength which "spills" into another color area can cause an observer to perceive a significantly different color analogous to a painter mixing different primary colors on a palette to produce secondary colors. The color mixing results in a perceived color and subjective interpretation that the color "does not look right".

The ghosted images for the on-axis object point are basically symmetric with respect to the image point and add directly on top of the signal PSF due to diffraction and aberrations as is illustrated in FIGS. 4 and 5. FIG. 4 illustrates the signal PSF and is basically a very narrow function due to the scale of the plot. The signal PSF has the classical "Airy" diffraction and spherically aberrated rings for a circularly symmetric imaging optical system when viewed at a smaller scale. FIG. 5 illustrates the PSF including the ghosted image contribution. The ghosted image is quite large and less than two orders of magnitude below the peak of the total PSF. This amount of stray light would be clearly visible to the human eye.

FIGS. 6 and 7 illustrate the on-axis signal ray path and the path of the ghosted rays with the most energy. Ghosted rays can come from many such paths, each contributing to the total ghost image. Note that the signal rays come to a reasonably sharp focus while the ghosted rays do not. FIGS. 8 and 9 illustrate the off-axis signal ray path and the path of the ghosted rays with the most energy. Note that the signal rays again come to a reasonably sharp focus off axis while the ghosted rays do not and moreover are at the other side of the detector. The ghost images in the off-axis case subsequently have very little effect on the total PSF for that particular field angle.

Many optical systems have planar pieces of glass, prisms, or even beamsplitters as part of their optical trains that act as filters (e.g.: filters and protective plates in CCD cameras), fold the optical path (e.g.: prisms in binoculars and telescopes), and split the optical path in two (e.g.: beamsplitters in interferometers). In each of these cases the optical elements can be treated as glass blocks that basically shift the position of the image, especially if they are located behind the imaging optical elements. These glass blocks do induce aberrations. FIG. 10 illustrates an ideal lens system with a glass block and a filter between the imaging optical elements and the CCD detector. The imaging optical elements are simulated as a paraxial or ideal optical component that imparts no aberration to the image. The aperture stop of the optical system is at the ideal lens. The aperture stop is the physical stop in the optical system that limits the amount of light propagating to the image plane. FIGS. 11 and 12 illustrate the ghost reflections from the glass block. Again, the ghost reflections do not behave the same for on-axis and off-axis point sources. However, planar glass surfaces very close to detectors generally produce large ghost reflections in the general area of the PSF because of the short path length between the reflecting surface and the detector.

The two important points to summarize are that ghost image contributions can be quite large in general optical systems and even with anti-reflection coatings the ghost images do not necessarily have to follow exactly the position of the signal PSF.

Telecentric Optical Systems

The aperture stop of an optical system is basically the physical stop that limits the amount of light propagating to the detector. The aperture stop is the system aperture that determines the diameter of the cone of light that the optical system will accept from a point on the object. The aperture stop may be a physical diaphragm (with a hole in it) or it may be the limiting aperture of one of the lenses. In FIG. 1 of the triplet example, the stop is located just before the second, negative element. In FIG. 10 the stop is located right at the ideal lens.

The aperture stop is a physical stop in an optical system. Therefore, this stop can be imaged by the optical elements in front of and behind the stop. The entrance pupil is the image of the aperture stop formed by all of the active optical elements in front of the stop. The exit pupil is the image of the aperture stop formed by all of the active optical elements behind the stop. A cone of light from a point source directed at and exactly filling the entrance pupil will propagate unvignetted through the optical system and the aperture stop since the entrance pupil is an image of the aperture stop. Furthermore, this cone of light will appear to come from the exit pupil. In FIG. 1 of the triplet example, all of the optical elements in front of the aperture stop, which in this particular case is the first positive optical element, form the image of the aperture stop, which is the entrance pupil. In this same picture the negative element and the positive element of the triplet behind the aperture stop collectively form an image of the stop, which is the exit pupil. The entrance pupil and the exit pupil are then the images of the aperture stop in object and image space. In FIG. 10, the aperture stop is at the ideal lens so no optical elements form images of the aperture stop. In this case the entrance and exit pupils are then at the same location as the aperture stop.

A telecentric system is an optical system where the aperture stop is placed at either the front or rear focal point of the optical system. The front focal point is a cardinal point of the optical system where an on-axis point source of light diverging from or converging to this point will be collimated by the optical system. The rear focal point is a cardinal point of the optical system where a collimated point source incident on the optical system will be brought to focus. When the aperture stop of the optical system is placed at a front or rear focal point then the image of the aperture stop, either the entrance or exit pupil or possibly both will be at infinity. FIG. 13 illustrates the different types of telecentric optical systems. Telecentricity is important in metrology optical systems where the size of an object is required not to change with object position and or focus.

If the aperture stop is placed at the rear focal point then the optical system is said to be telecentric in object space. The entrance pupil is at infinity. A special ray from the center of the point source traveling through the center of the aperture stop, and hence the center of the entrance pupil, is called the chief ray. When the entrance pupil is at infinity the chief rays of different object points are all parallel to the optical axis of the system. If the object position is changed, its magnification will not change at the image plane. The resulting image will have the same position and magnification but the image will be blurred as is illustrated in FIG. 13a.

If the aperture stop is placed at the front focal point then the optical system is said to be telecentric in image space. The exit pupil is at infinity. The chief ray traveling through the center of the aperture stop, and hence the center of the exit pupil, exits the optical system parallel to the optical axis as it intersects the image plane. If the image plane is now defocused, then the image will blur but its position and magnification will remain constant. FIG. 14 illustrates an optical system telecentric in image space. In fact this is the same system in FIG. 10 but with the aperture stop placed at the front focal point. The entrance pupil is also at this point. Both the chief rays from the on and off-axis points are parallel to the optical axis at the image plane.

Ghost Images in Telecentric Optical Systems

The ghost images generated from planar glass surfaces in the space between the imaging optical elements and the image plane in telecentric systems (telecentric in image space in the present discussion) have a very special property. Because of the collinear behavior of the chief rays in this space, the ghost images generated from these planar optical elements are essentially shift invariant. In other words the ghost images produced by these optical elements do not change their shape with different field angles or points because they essentially travel the equivalent paths for all field angles. FIGS. 15 and 16 illustrate this phenomenon with the image space telecentric optical system. The ghost rays from different field angles produce the same ghost paths! FIGS. 17 through 19 illustrate the on-axis and off-axis signal and first two ghost paths for comparison. The respective paths are, of course, identical.

Moreover, not only are the ghost paths the same for the on and off-axis cases but the ghost image contribution to the point spread function has the same shape for each field position differing in amplitude only by a multiplicative factor. The difference in the amplitude of the ghost images from the imaging optics would be due to different Fresnel reflection and transmission losses, cosine fall off, and any potential vignetting. Exhibits B through D illustrate the on-axis and off-axis PSFs, ghost contributions, and combined ghost and PSF spread functions.

The ghost image's invariance with field position will allow the ghost images from the planar optical elements to be subtracted or removed from the image of an object recorded on a detector such as a CCD or CMOS detector provided the optical system is telecentric in image space. This subtraction may be accomplished, for example, with the removal technique of Jansson U.S. Pat. No. 5,153,926 and by Jansson's Patent Application, entitled "Method, Program and Apparatus for Efficiently Removing Stray-Flux Effects by Selected-Ordinate Image Processing", Ser. No. 09/956,684, filed Sep. 20, 2001 and assuming a measured or analytic ghost function germane and invariant to that particular optical system. The ghost function's irradiance could be scaled to account for irradiance variations due to different Fresnel reflection and transmission losses, cosine fall off, and any potential vignetting. Such corrections could be implemented as isoplanatic patches where the correction is facilitated over that particular patch. Furthermore, the ghost function, being shift invariant can be linearly combined with a scatter function such as the Harvey scatter function for the optical system by the superposition theory. The ghost image and scatter functions are incoherent with respect to each other in optical systems illuminated with light having a short coherence length and their respective energy densities can be added linearly. Therefore, both noise contributions, the combination being linear shift invariant, could be removed from the resulting digital image.

The linear shift invariance of ghost and scatter images is illustrated in measurements from an actual digital camera that is telecentric in image space containing planar optical elements between the imaging optics and the CCD detector. Telecentric optical systems that are telecentric in image space are used in systems using digitial detectors such as CCDs or CMOS detectors in digital cameras. The amount of light recorded on CCD and CMOS detectors is dependent on the angle at which light is incident on the detector surface. The detector reflects less light and therefore the detector at normal incidence absorbs more light. Therefore, optical systems that are telecentric in image space in digital detector systems that force the light to be normally incident on the detector record more power.

Exhibit E illustrates the ghost images and scatter light plotted on a log-log plot consistent with the Harvey formulation for an actual digital camera. At different angles of incidence the stray light curves outside of the central core of the PSF overlap each other and hence are linear shift invariant. The angles of incidence are 0, 7.75, and 15.5 degrees.

SUMMARY OF THE PRESENT INVENTION

The present invention provides a new and useful method and system for correcting for ghost images in a telecentric optical system. The invention is particularly useful with an optical system in which ghost images are produced by one or more planar surfaces located in image space of a system which is telecentric in image space. Moreover, its principles are applicable to a system which is telecentric in object space, and also to a system which has dual telecentricity.

In a preferred embodiment, the principles of the present invention are used in a system and method for removing ghost images from a telecentric optical system comprising telecentric optics which are telecentric in image space, where at least one planar surface that produces ghost images is located in image space after the telecentric optics. According to the present invention, (i) the telecentric optical system is configured to determine a characteristic function for the ghost images produced by the planar surface, and (ii) correct for the ghost images by a technique that is based on the characteristic function. The technique for correcting for ghost images is preferably a software based technique.

Other features of the present invention will become apparent from the following detailed description and the accompanying drawings and exhibits.

BRIEF DESCRIPTION OF THE DRAWINGS AND EXHIBITS

Exhibit A is an example of a ghost image of an aperture stop produced by sunlight (the ghost image is in the upper right corner) in a 35 mm film based camera;

FIGS. 1 through 3 are examples of ghost imaging where each surface of the optical elements has a single layer anti-reflection (AR) coating. FIG. 1 illustrates the triplet lens system with a collimated point source on-axis and at 10 degrees off-axis. FIGS. 2 and 3 illustrate a small number of ghosted rays traced through the optical system for the on-axis and off-axis cases, as described in the Introduction;

FIG. 4 illustrates the signal PSF and is basically a very narrow function due to the scale of the plot. The signal PSF has the classical "Airy" diffraction and spherically aberrated rings for a circularly symmetric imaging optical system when viewed at a smaller scale, as described in the Introduction;

FIG. 5 illustrates the PSF including the ghosted image contribution, as described in the Introduction;

FIGS. 6 and 7 illustrate the on-axis signal ray path and the path of the ghosted rays with the most energy, as described in the Introduction;

FIGS. 8 and 9 illustrate the off-axis signal ray path and the path of the ghosted rays with the most energy, as described in the Introduction;

FIG. 10 illustrates an ideal lens system with a glass block and a filter between the imaging optical elements and the CCD detector, as described in the Introduction;

FIGS. 11 and 12 illustrate the ghost reflections from a glass block such as a beamsplitter, as described in the Introduction;

FIG. 13 illustrates the different types of telecentric optical systems, as described in the Introduction;

FIG. 14 illustrates an optical system telecentric in image space, as described in the Introduction;

FIGS. 15 and 16 illustrate ghost images for on-axis and off-axis point sources in telecentric optical system that is telecentric in image space, as described in the Introduction;

FIGS. 17 through 19 illustrate the on-axis and off-axis signal and first two ghost paths for comparison, as described in the Introduction;

Figure 20:
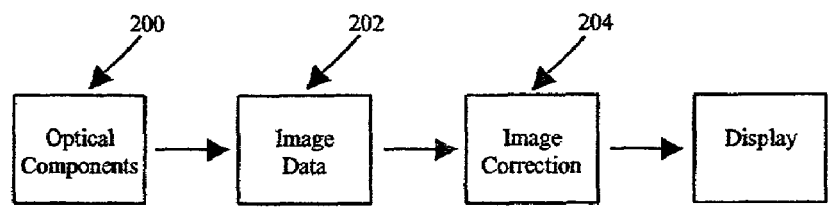
Figure 21:
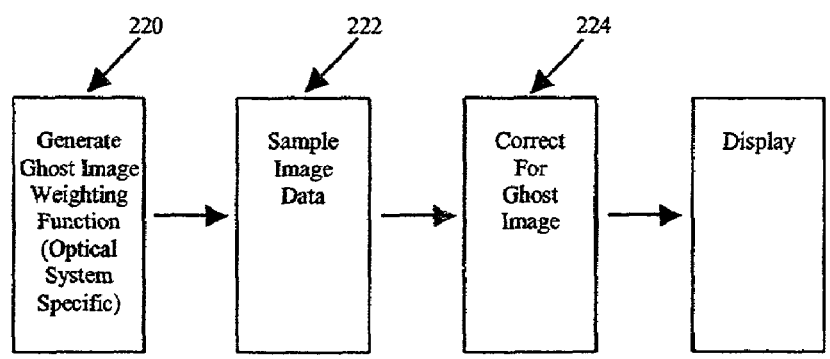

Exhibits B through D illustrate the on-axis and off-axis PSFs, ghost contributions, and combined ghost and PSF spread functions, as described in the Introduction;

Exhibit E illustrates the measured ghost images and scatter light plotted on a log-log plot consistent with the Harvey formulation, as described in the Introduction;

FIG. 20 schematically illustrates a system for correcting for ghost images, according to the principles of the present invention;

FIG. 21 schematically illustrates the manner in which the present invention corrects for ghost images;

Exhibits F–X are similar to FIGS. 1–19, but use color to better illustrate certain components.

DETAILED DESCRIPTION

In the Introduction and Summary, it is explained that ghost images generated from planar optical surfaces in the image space after the major elements of a telecentric optical system, telecentric in image space, are shift invariant. In other words the ghost images produced by these optical elements do not change their shape with different field angles or points. The ghost image's invariance with field position will allow the ghost image to be subtracted or removed from the image of an object recorded on a digital detector such as a CCD or CMOS detector when its optical system is telecentric in image space. This subtraction may be accomplished, for example, with a removal technique using a measured ghost function germane and invariant to that particular optical system. Moreover, the principles of the present invention can also be practiced with a system that is telecentric in object space and with a system which has dual telecentricity.

A telecentric system which is shift invariant in image space can form part of a digital camera. In such a system, the image plane would include a digital image receptor (e.g. a CCD array or a CMOS detector), and an optics assembly (e.g. a lens assembly) that transmits and focuses an image to the image plane. The system would include one or more planar surfaces (e.g. prisms, filters, cover glasses, beamsplitters) which are potential sources of ghosted images.

The system of FIG. 20 includes optical components 200 which include the lens assembly and the planar surfaces that are potential sources of ghost images. The system also includes an image data storage component 202 which can store image data which represents the image produced on an image plane (e.g. a CCD or CMOS detector) by the optical components. The system further includes an image correction component 204 which applies a correction to the image data from the image data storage component, and produces on a display 206 an image which has been corrected for the ghost images. The optical components 200 preferably comprise an optical system which are telecentric in image space, and includes at least one planar surface that produces ghost images. The planar surface is located in image space after said telecentric optics, as illustrated in FIGS. 13b and 15.

The image storage component 202 can be designed for temporary or permanent storage of the image data produced on the image plane by the optical components. That component can use processing and storage devices which are well known in optical image processing.

As explained above, the image correction component 204 is designed to correct the image data to remove the effects of the ghost images. The image correction component uses conventional processing equipment, and software running on the processing equipment to correct for ghost images. The principles of the correction software are based on Jansson U.S. Pat. No. 5,153,926, which has been incorporated herein by reference, and by a subsequent Jansson Patent Application, entitled "Method, Program and Apparatus for Efficiently Removing Stray-Flux Effects by Selected-Ordinate Image Processing", Ser. No. 09/956,684, filed Sep. 20, 2001.

The Jansson application corrects for corruption of an image, e.g. by stray light, by sampling portions of the image at unequal intervals, which are selected to effect a weighting of the samples corresponding to a predetermined weighting function (which has been predetermined for the particular optical system), summing the weighted samples to create an approximation to a weighted integral, and then repeating the foregoing steps to compute weighted integrals for each of the image elements, and thereby to correct the image produced from the corrupted image data. In its preferred form, the Jansson application utilizes a look up table to generate the weighted samples, which speeds up the process.

With the present invention, a characteristic function for ghost images produced by the planar surface is predetermined for the particular optical system, as shown at 220 in FIG. 21. Thus, if an optical system is telecentric in image space, and the planar surface is located in image space after the telecentric optics, the characteristic function is predetermined for such a system. The characteristic function is preferably a weighting function similar to the weighting function described in Jansson U.S. Pat. No. 5,153,926 and Jansson application. The correction technique for the ghost images then follows the techniques described in the Jansson application, and particularly samples the image data (as shown at 222 in FIG. 21), utilizes the look up table to generated the weighted samples that are then processed for each image element in the manner described in the Jansson application to correct the image data for the effects of ghost images (as shown at 224 in FIG. 21).

Currently, computer ray trace simulation is the preferred embodiment for determining the weighting function. There are many commercially available ray trace programs that allow simulation of ghost images in an optical system. One such program is know as "ASAP", the Advanced Systems Analysis Program, and is marketed by Breault Research Organization, Tucson, Ariz. These programs allow the user to simulate the optical properties of an optical interface in order to generate ghost rays. They can simulate multi-layer coatings by entering the coating prescription on a layer by layer basis with complex indices of refraction or simulate coatings with measured data. Reflection and transmission coefficients can even be entered as a function of wavelength and polarization resulting in high fidelity simulations. Subsequently generated ghost rays can be generated in the traditional sense by creating a reflected and transmitted ray at each interface having a non-zero reflection and transmission coefficient or launched either as a reflected or transmitted ray based upon the probability of reflection and transmissions at that interface. The probability of reflection or transmission is in fact the reflection and transmission coefficients and generating ghost rays in this manner simulates a Monte-Carlo process.

Evaluating the contributions of individual components of the ghost images, especially those planar surfaces in the image space of a telecentric system, telecentric in image space, is crucial to identifying the major ghost image contributors for later corrective action. The ghost images of the planar surfaces need to be separated from those of other optical surfaces whose generated ghosts do not behave in a shift invariant manner. Many of these commercially available ray trace programs allow for such an evaluation. These programs can automatically sort ghost rays at a particular surface into common categories based upon their stray light origin. Rays in a particular category or path, such as those from the planar surfaces of optical elements in the image space of a telecentric system, telecentric in image space, form a stray light path that can be isolated and evaluated numerically. The mathematical shape or functional form of the irradiance pattern produced at the detector from these paths can be determined in simulation and used as the weighting function for corrective action. These simulations are especially effective for determining the weighting function of optical systems telecentric in object space (FIG. 13a) and those with duel telecentricity (FIG. 13c).

Thus, according to the foregoing disclosure, a method and system for correcting a telecentric optical system has been described. With the principles of the invention in mind, it will be clear to those in the art how the present invention can be used to correct for ghost images in various types of optical systems.

Exhibit A. Ghost Image of Aperture Stop Produce by Sunlight (Ghost in Upper Right Corner)

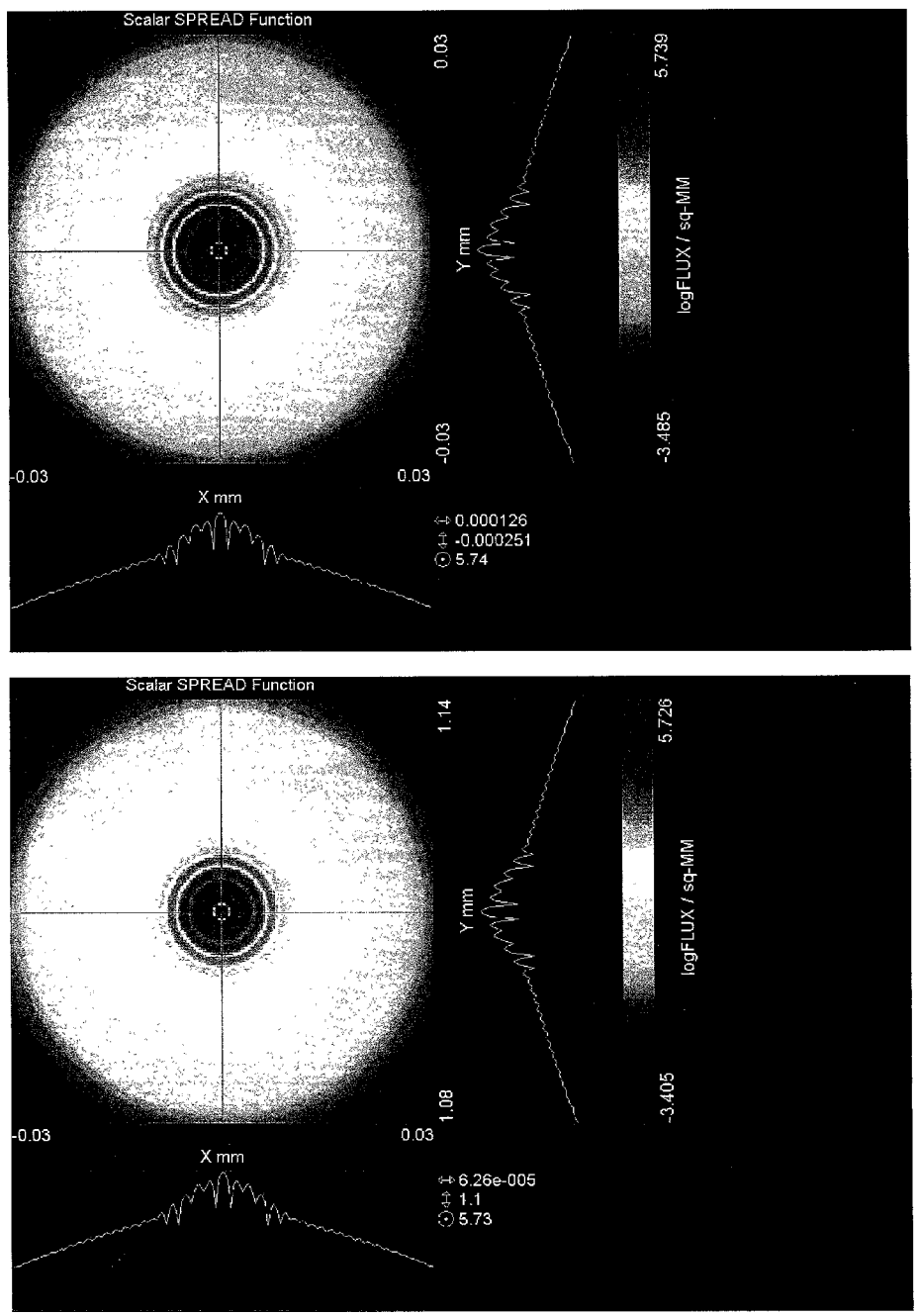
Exhibit B On and Off-axis PSFs

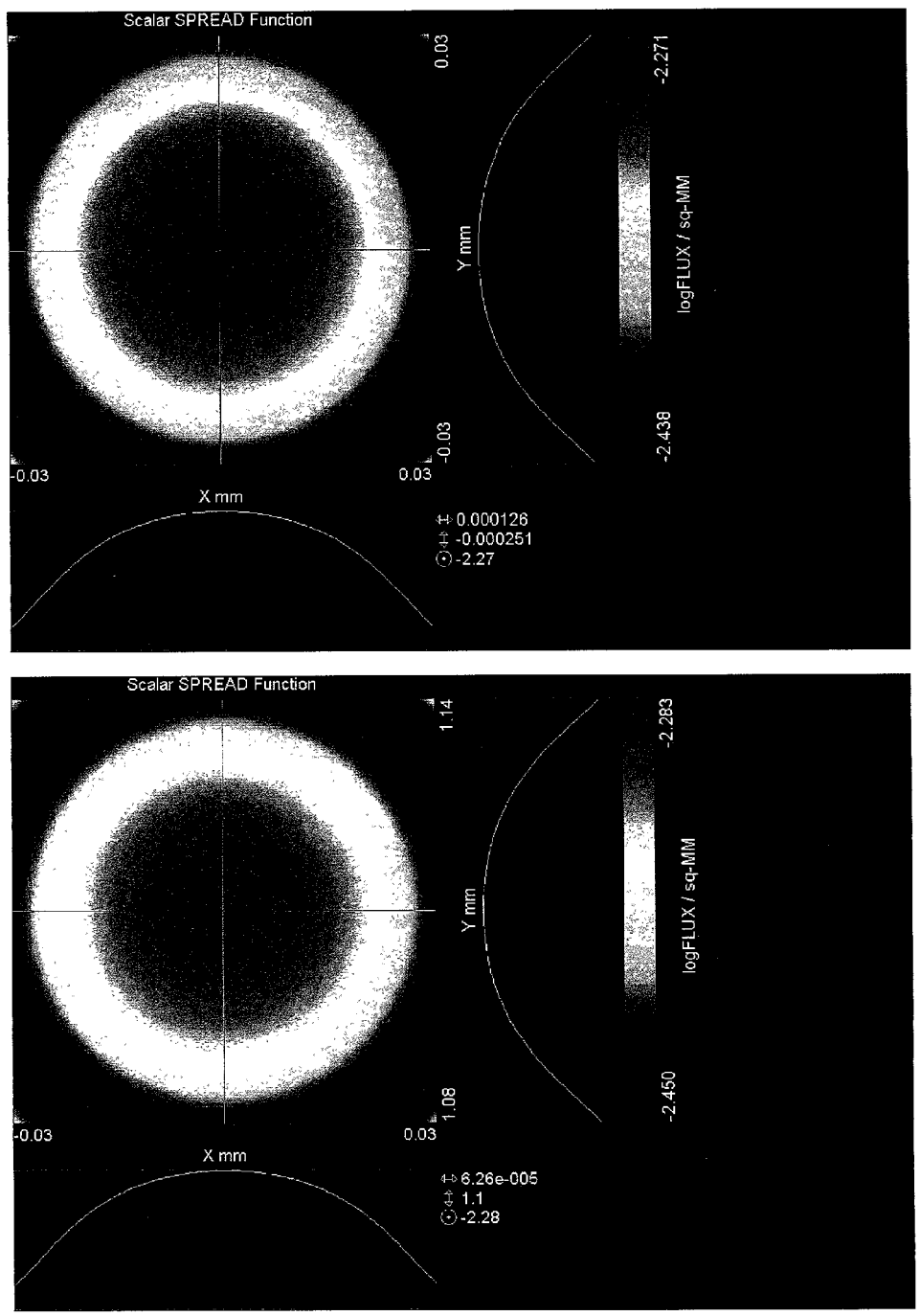
Exhibit C On and Off-axis Ghost Images

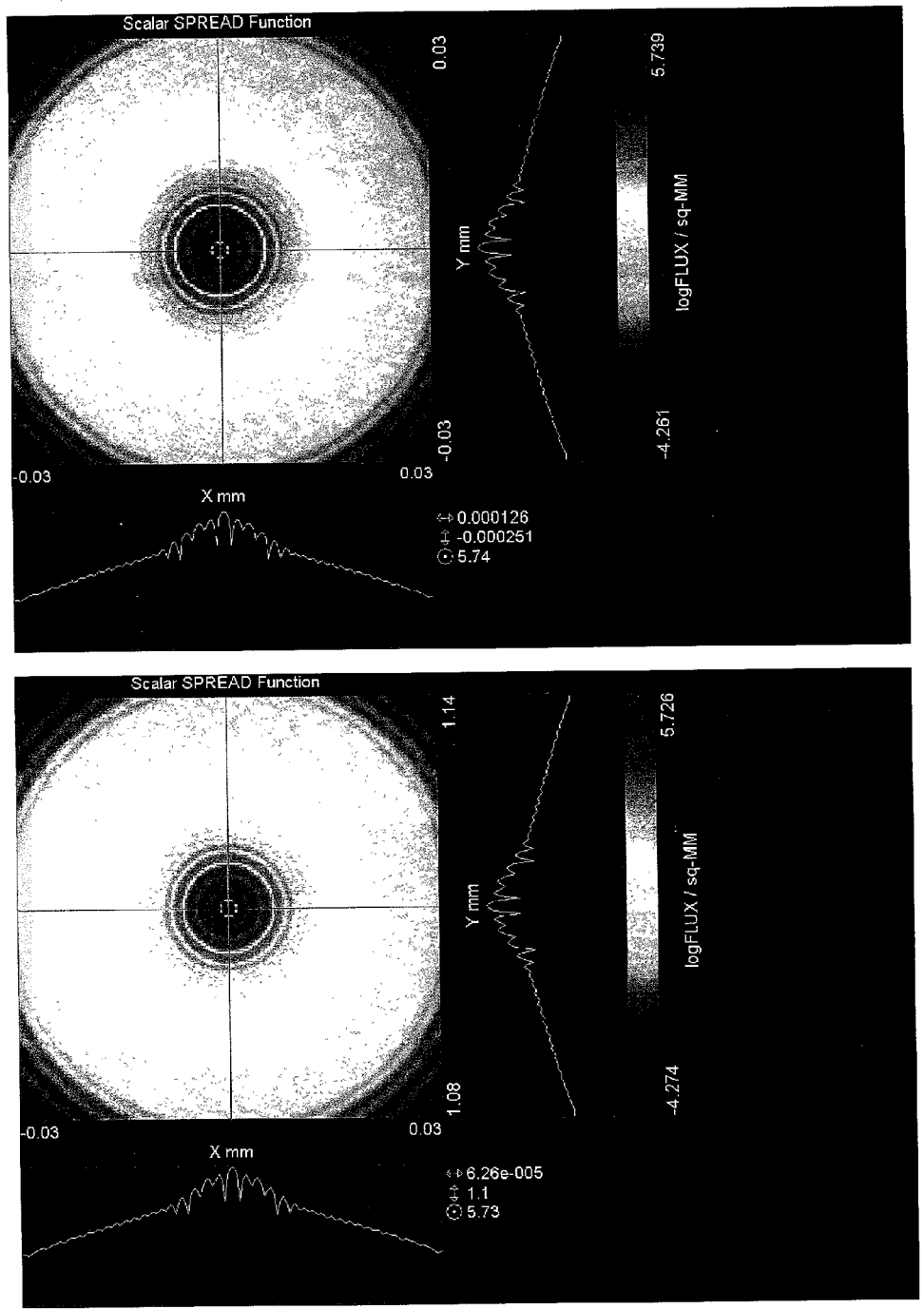
Exhibit D On and Off-axis PSFs with Ghost Contributions

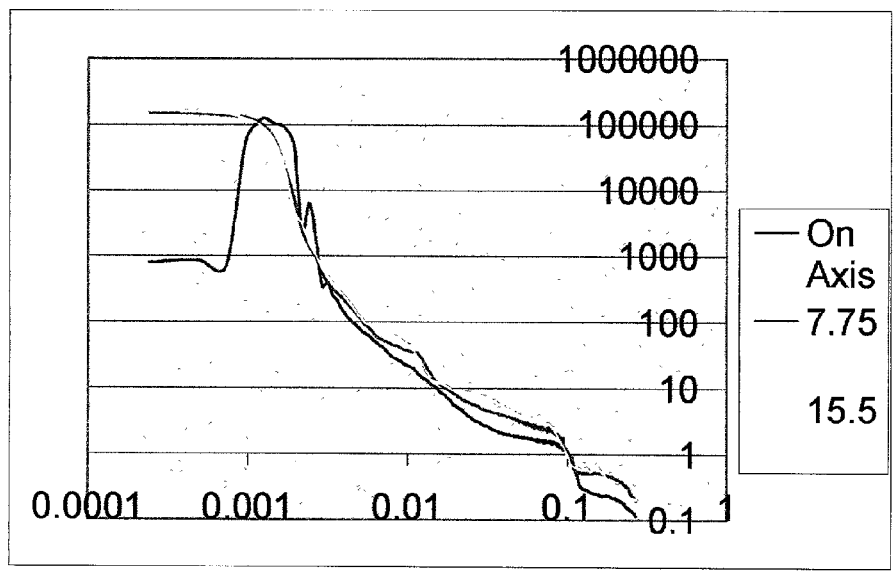
Exhibit E. Measured Data Illustrating the Shift Invariance of Scattered Light and Ghost Images from a Telecentric Optical System (Telecentric in Image Space) of a Digital Camera

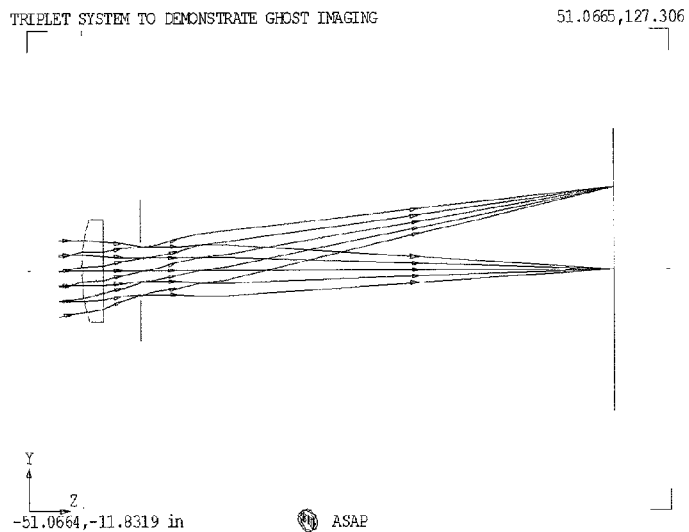
Exhibit F Triplet Lens System with On and Off Axis Point Sources
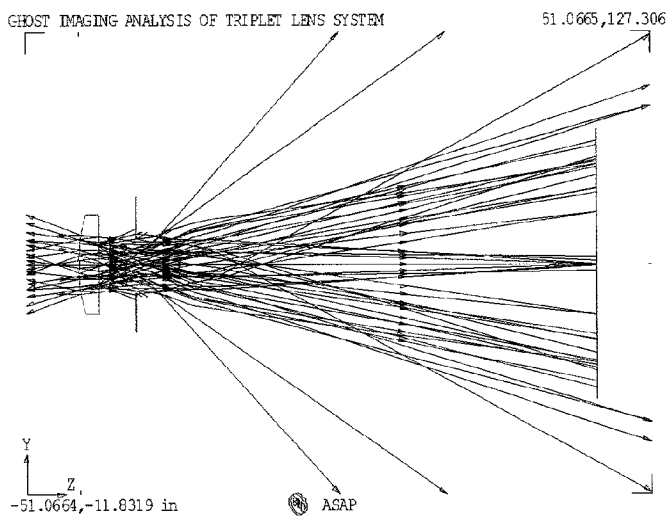
Exhibit G Ghost Reflections through Triplet from On-axis Point Source

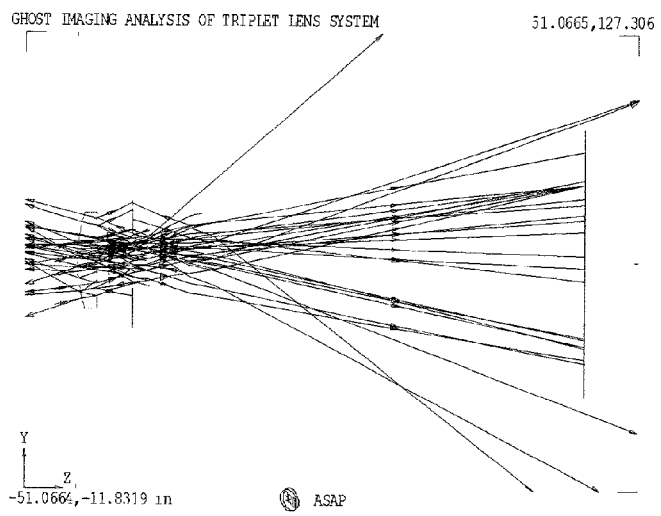
Exhibit H Ghost Reflections through Triplet from Off-axis Point Source
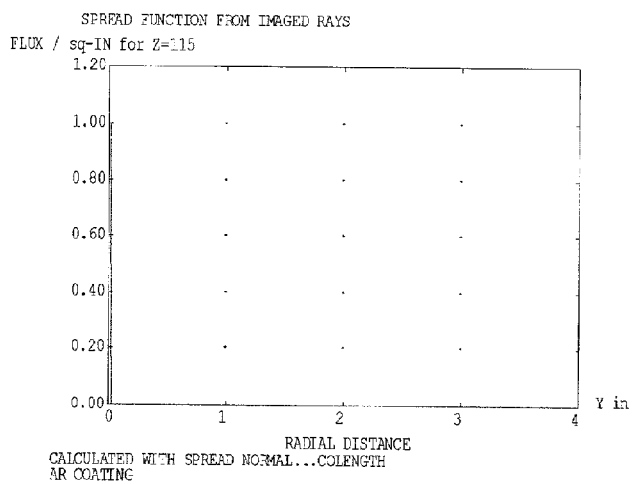
Exhibit I System PSF due to Diffraction and Aberration

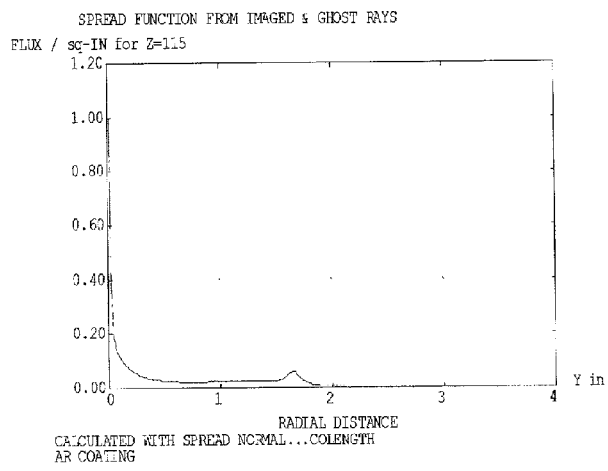
Exhibit J System PSF due to Diffraction, Aberration, and Ghost Images

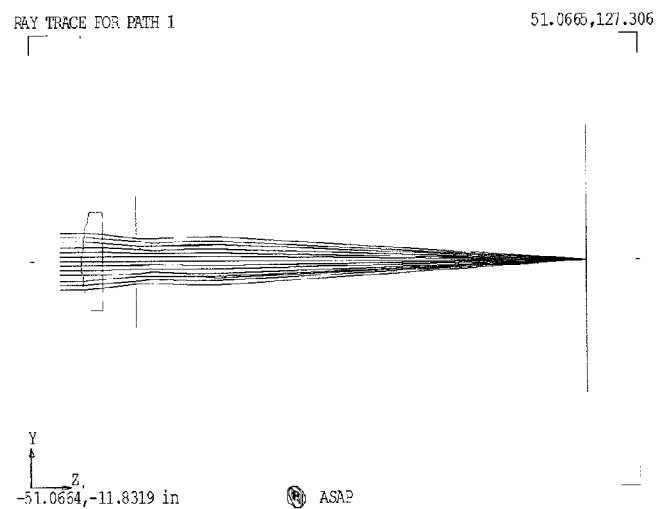
Exhibit K On-Axis Signal Path
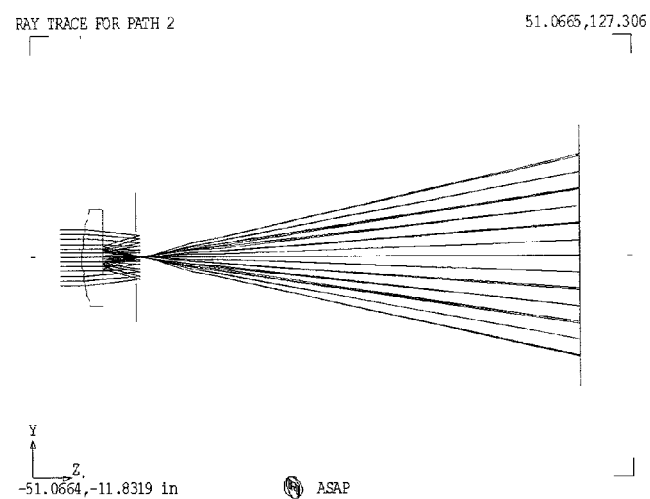
Exhibit L On-Axis Ghost Path of Most Energy

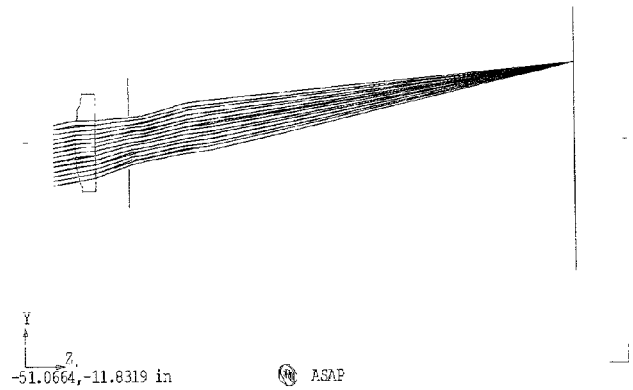
Exhibit M Off-Axis Signal Path
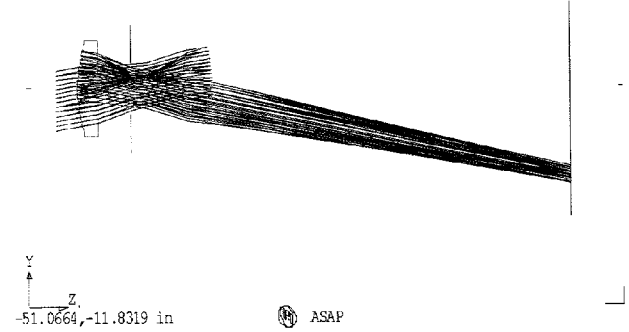
Exhibit N Off-Axis Ghost Path of Most Energy

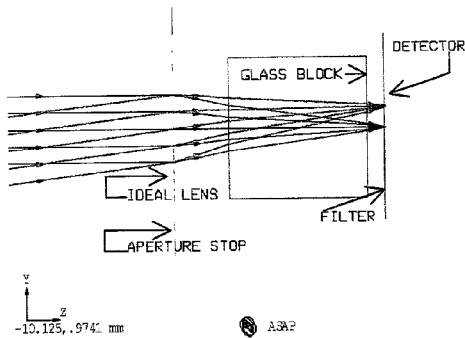
Exhibit O On and Off-axis Point Sources Imaged Through an Ideal Lens with the Stop at the Lens, A glass block, and a Filter
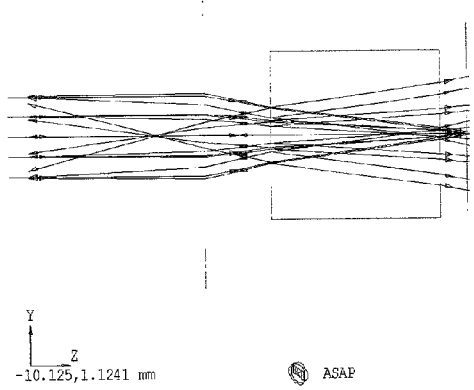
Exhibit P On-axis Ghost Rays

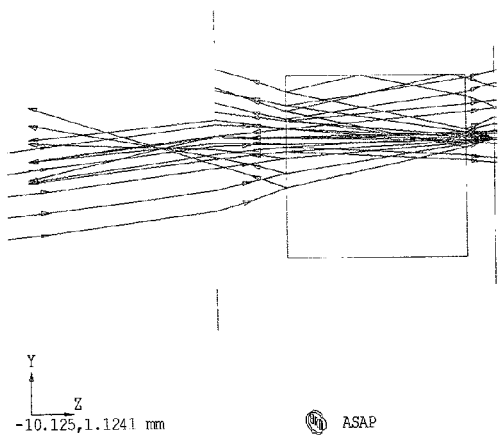
Exhibit Q Off-axis Ghost Rays
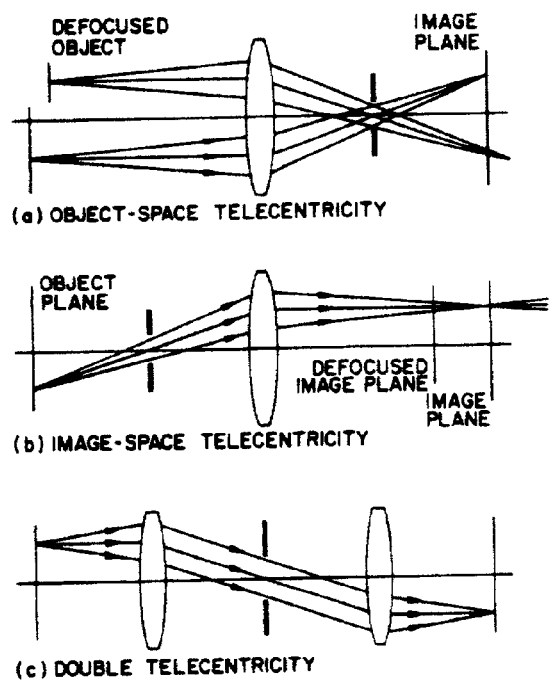
Exhibit R Telecentric Optical Systems

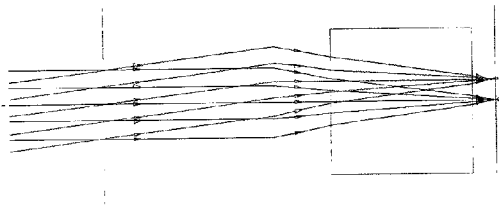
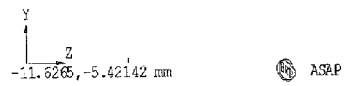
Exhibit S On and Off-axis Point Sources Imaged Through an Ideal Telecentric Lens System with the Stop at the front focal point, A glass block, and a Filter
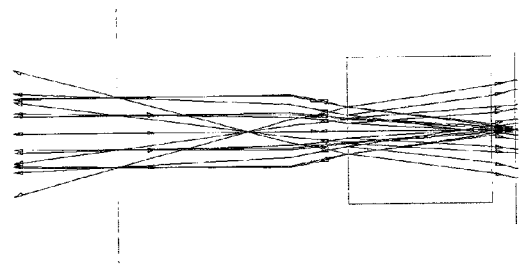
Exhibit T Ghost Image for an On-axis Point Source Through a Telecentric Optical System that is Telecentric in Image Space

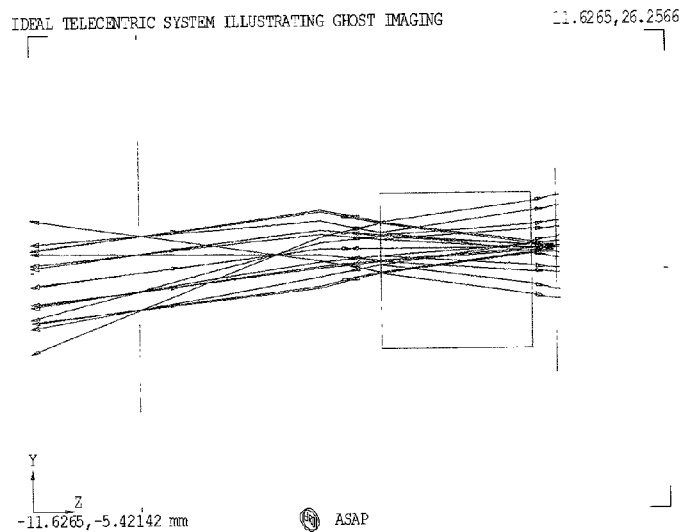
Exhibit U Ghost Image for an Off-axis Point Source Through a Telecentric Optical System that is Telecentric in Image Space

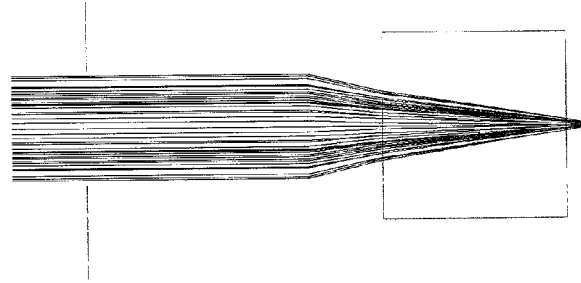
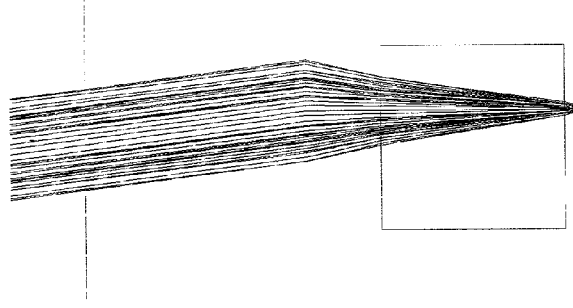
Exhibit V On and Off-axis Signal Paths

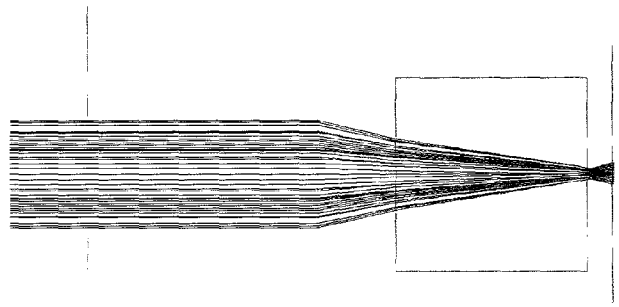
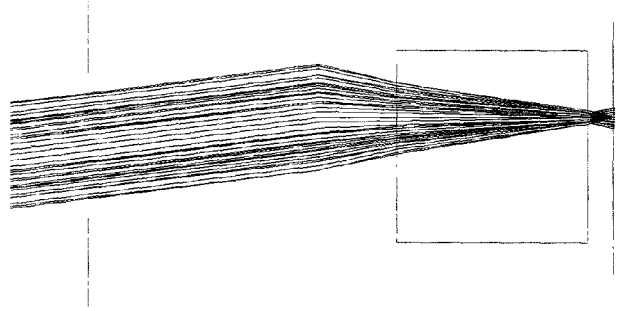
Exhibit W. On and Off-axis Most Energetic Ghost Paths

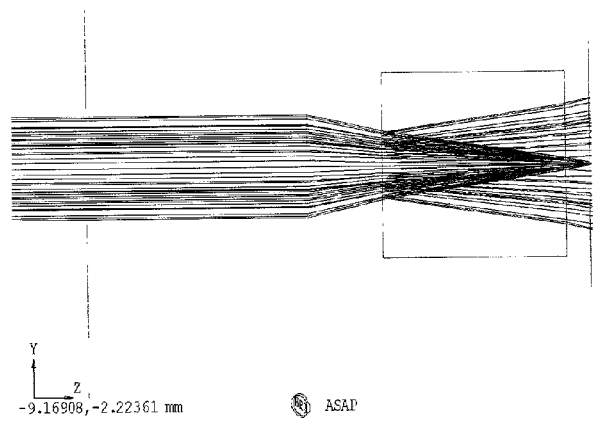
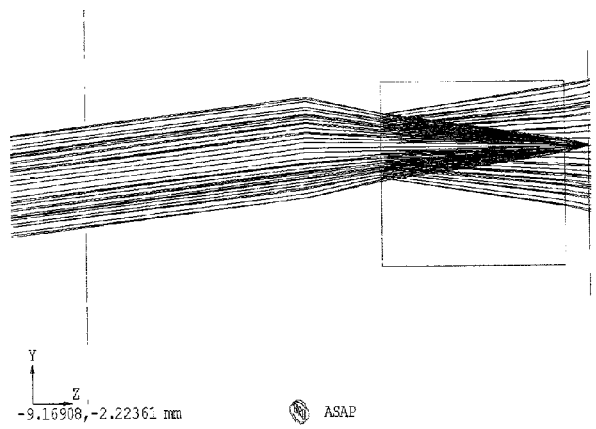
Exhibit X On and Off-axis Second Most Energetic Ghost Paths

What is claimed is:

1. Apparatus comprising a telecentric optical system for transmitting an image to a digital image plane, said telecentric optical system comprising
   (a) telecentric optics which are telecentric in image space,
   (b) at least one planar surface that produces ghost images, said planar surface located in image space after said telecentric optics, and
   (c) said telecentric optical system configured to process image data from the telecentric optics, to determine a characteristic function for the ghost images produced by the planar surface, and to provide correction for the ghost images based on the characteristic function.

2. Apparatus as set forth in claim 1, wherein said characteristic function comprises a weighting function that has been predetermined for the telecentric optical system.

3. Apparatus comprising a telecentric optical system for transmitting an image to a digital image plane, said telecentric optical system comprising
   (a) telecentric optics which are telecentric in object space,
   (b) at least one planar surface that produces ghost images, said planar surface located in object space before said telecentric optics, and
   (c) said telecentric optical system configured to process image data from the telecentric optics, to determine a characteristic function for the ghost images produced by the planar surface, and to provide correction for the ghost images based on the characteristic function.

4. Apparatus as defined in claim 3, wherein said characteristic function comprises a weighting function that has been predetermined for the telecentric optical system, and wherein said telecentric optical system provides correction by sampling portions of the image data to produce weighted samples corresponding to the predetermined weighting function, sum the weighted samples to create an approximation to a weighted integral, and then repeat the foregoing steps to compute weighted integrals for each of the image elements, and thereby to correct the image data.

5. Apparatus comprising a telecentric optical system for transmitting an image to a digital image plane, said telecentric optical system comprising
   (a) telecentric optics which have double or dual telecentricity,
   (b) at least one planar surface that produces ghost images, located in image space after said telecentric optics and/or another planar surface located in object space before said telecentric optics,
   (c) said telecentric optical system configured to process image data from the telecentric optics, to determine a characteristic function for the ghost images produced by the planar surface, and to provide correction for the ghost images based on the characteristic function.

6. Apparatus as defined in claim 5, wherein said characteristic function comprises a weighting function that has been predetermined for the telecentric optical system, and wherein said telecentric optical system provides correction by sampling portions of the image data to produce weighted samples corresponding to the predetermined weighting function, sum the weighted samples to create an approximation to a weighted integral, and then repeat the foregoing steps to compute weighted integrals for each of the image elements, and thereby to correct the image data.

7. A method for providing ghost image correction in a telecentric optical system for transmitting an image to a digital image plane, where the telecentric optical system comprises telecentric optics which are telecentric in image space, and at least one planar surface produces ghost images is located in image space after the telecentric optics, the method comprising the steps of
   (a) processing image data from the telecentric optics, to determine a characteristic function for the ghost images produced by the planar surface, and
   (b) providing correction for the ghost images, based upon the characteristic function for the ghost images.

8. A method as set forth in claim 7, wherein the characteristic function comprises a weighting function that has been predetermined for the telecentric optical system, and wherein the correction is provided by sampling portions of the image data to produce weighted samples corresponding to the predetermined weighting function, summing the weighted samples to create an approximation to a weighted integral, and then repeating the foregoing steps to compute weighted integrals for each of the image elements, and thereby to correct the image data.

9. A method for providing ghost image correction in a telecentric optical system for transmitting an image to a digital image plane, where the telecentric optical system comprises telecentric optics which are telecentric in object space, and at least one planar surface produces ghost images is located in object space before the telecentric optics, the method comprising the steps of
   (a) processing image data from the telecentric optics, to determine a characteristic function for the ghost images produced by the planar surface, and
   (b) providing correction for the ghost images, based upon the characteristic function for the ghost images.

10. A method as set forth in claim 9, wherein the characteristic function comprises a weighting function that has been predetermined for the telecentric optical system, and wherein the correction is provided by sampling portions of the image data to produce weighted samples corresponding to the predetermined weighting function, summing the weighted samples to create an approximation to a weighted integral, and then repeating the foregoing steps to compute weighted integrals for each of the image elements, and thereby to correct the image data.

11. A method for providing ghost image correction in a telecentric optical system for transmitting an image to a digital image plane, where the telecentric optical system comprises telecentric optics which have dual telecentricity, and wherein at least one planar surface that produces ghost images is located in image space after the telecentric optics and or another planar surface that produces ghost images is located in object space before the telecentric optics, the method comprising the steps of
   (a) processing image data from the telecentric optics, to determine a characteristic function for the ghost images produced by the planar surface, and
   (b) providing correction for the ghost images, based on the characteristic function for the ghost images.

12. A method as set forth in claim 11, wherein the characteristic function comprises a weighting function that has been predetermined for the telecentric optical system, and wherein the correction is provided by sampling portions of the image data to produce weighted samples corresponding to the predetermined weighting function, summing the weighted samples to create an approximation to a weighted integral, and then repeating the foregoing steps to compute weighted integrals for each of the image elements, and thereby to correct the image data.

13. Apparatus comprising a telecentric optical system for transmitting an image to a digital image plane, said telecentric optical system comprising a. telecentric optics which are telecentric in image space,
b. at least one planar surface that produces ghost images, said planar surface located in image space after said telecentric optics,
c. said telecentric optical system configured to determine a characteristic function for the ghost images produced by the planar surface, and to provide correction for the ghost images based on the characteristic function;

wherein said telecentric optical system produces image data corresponding to image data from an object, and said correction is configured to sample portions of the image data to produce weighted samples corresponding to the predetermined weighting function, sum the weighted samples to create an approximation to a weighted integral, and then repeat the foregoing steps to compute weighted integrals for each of the image elements, and thereby to correct the image data.

* * * * *